US008419556B2

(12) United States Patent
Eguchi et al.

(10) Patent No.: US 8,419,556 B2
(45) Date of Patent: Apr. 16, 2013

(54) NUT, FEMALE THREAD MACHINING DEVICE AND FEMALE THREAD MACHINING METHOD

(75) Inventors: Yota Eguchi, Tochigi (JP); Hiroki Fujiuchi, Tochigi (JP); Naoki Takahashi, Tochigi (JP); Toshihiro Murakawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 683 days.

(21) Appl. No.: 12/547,001

(22) Filed: Aug. 25, 2009

(65) Prior Publication Data

US 2010/0056284 A1     Mar. 4, 2010

(30) Foreign Application Priority Data

Aug. 27, 2008  (JP) ................................. 2008-217937
Aug. 27, 2008  (JP) ................................. 2008-217942
Aug. 27, 2008  (JP) ................................. 2008-217946

(51) Int. Cl.
*B21D 53/24*     (2006.01)
*B21H 3/08*      (2006.01)
*B21K 1/64*      (2006.01)

(52) U.S. Cl.
USPC ............................................. 470/18; 470/87

(58) Field of Classification Search .......... 470/26, 470/66, 84, 96, 198, 199, 204, 18, 87; 408/215, 408/222

See application file for complete search history.

(56) References Cited

U.S. PATENT DOCUMENTS 2,946,244 A *  7/1960  Maynard ...................... 408/1 R
3,105,982 A * 10/1963  Yost et al. ...................... 470/96
4,271,554 A *  6/1981  Grenell ......................... 470/204
6,425,829 B1 *  7/2002  Julien ............................ 470/11
7,552,610 B2 *  6/2009  Fujiuchi et al. ................ 470/84

FOREIGN PATENT DOCUMENTS

| JP | 58-96112 U   | 6/1983  |
| JP | 64-35215 U   | 3/1989  |
| JP | 1-105012 A   | 4/1989  |
| JP | 1-87315 U    | 6/1989  |
| JP | 1-306124     | 12/1989 |
| JP | 6-39637 A    | 2/1994  |
| JP | 8-200343     | 8/1996  |
| JP | 2000-192928  | 7/2000  |
| JP | 2002-521204 A | 7/2002 |
| JP | 3100223 U    | 5/2004  |
| JP | 2005-329528  | 12/2005 |
| JP | 2006-118582  | 5/2006  |
| JP | 2006-226465 A | 8/2006 |

OTHER PUBLICATIONS

"Neji Teiketu, 'Sin' Jousiki No Uso, Neji No Ougi Wo Zenkoukai" (edited by Nikkei Mechanical, first edition, second printing, Nikkei BP Co. Ltd. May 9, 1997, pp. 77 to 79), Discussed on p. 4 of specification.

* cited by examiner

*Primary Examiner* — Teresa M Ekiert
(74) *Attorney, Agent, or Firm* — Rankin, Hill & Clark LLP

(57) ABSTRACT

There is provided a nut having a thread portion having a female thread, a metallic plate portion having a base segment, and a hardness gradient portion provided between the thread portion and the metallic plate portion. The thread portion, metallic plate portion and the hardness gradient portion are monolithic each other, a metallographic structure of the metallic plate portion differs from a metallographic structure of the thread portion and a hardness of the hardness gradient portion is lower than a hardness of the thread portion and lowers from the thread portion toward the metallic plate portion.

12 Claims, 25 Drawing Sheets

NUT, FEMALE THREAD MACHINING DEVICE AND FEMALE THREAD MACHINING METHOD

BACKGROUND OF THE INVENTION

1. Field of the Invention

This invention relates to a nut which has a female thread for fastening another member to a metallic plate by a bolt, a female thread machining device and a female thread machining method for forming the female thread.

2. Description of Related Art

Japanese Patent Unexamined Publication JP-A-8-200343 discloses that a bolt is fastened to a nut which is integrated with a washer to fix two metallic plates which are fastened members. In this case, the nut is not integrated with the metallic plates, and thus, for fastening the nut to the metallic plate, drilling process on the metallic plates and provisional fixing of the nut to the bore are required.

In the nut of JP-A-8-200343, a seat surface is convex shape so that a side of fastening component is higher toward its center. Thus, a workpiece is difficult to be injured on the seat surface of the nut. Further, this nut has a shape in which radial thickness becomes thinner toward a not-fastening-component side, however, the operation and effect owing to this structure are not particularly described in the JP-A-8-200343.

On the other hand, in manufacturing a vehicle, when welding the nut on a bolting point such as a door hinge of a frame, precise positioning in welding process is difficult and also the welding process is troublesome.

Japanese Patent Unexamined Publication JP-A-1-306124 proposes a device capable of forming various female threads on a workpiece. However, this device is not suitable to form the female thread on a thin plate such as a frame of a motor vehicle.

Japanese Patent Unexamined Publication JP-A-2005-329528 proposes a female machining device which does not require welding process of the nut. In this machining device, a machining tool is inserted into a metallic plate while rotating the machining tool and a hole is formed on the metal plate by a small diameter section of the machining tool. Then, while inserting the machining tool, the machining tool is rotated and inserted further and a female thread is formed in the hole by a tapping section of the machining tool. Further, by adding excessive material onto the hole as a filler, this machining device can be also applied to a thin plate such as the frame of the motor vehicle. As a result, a bushing having the female thread can be formed by a single process.

Meanwhile, where the nut is welded on the metallic plate, the nut essentially has a sufficient strength and has a sufficient fastening strength for the bolt. However, the female thread formed on the bushing formed by adding the excessive material onto the thin plate does not always have a sufficient strength. Thus, careful experiment and inspection therefor are required.

Further, where the nut formed monolithically with the metallic plate is applied to the motor vehicle, vibration will be applied to the nut for a long time. Thus, there is a fear of loosing the fastening of bolt and the fastening torque must be particularly high, or otherwise some locking means must be provided.

Further, Japanese Patent Unexamined Publication JP-A-2006-118582 discloses a concave nut in which a seat surface on a component fastening side is concaved toward the center and discloses that torque is applied until the concave becomes deformed to be brought into plane-contact with the workpiece. According to this nut, great fastening torque is needed to deform the concave so that loosening is not likely to occur.

"NEJI TEIKETU, 'SIN' JOUSIKI NO USO, NEJI NO OUGI WO ZENKOUKAI" (edited by Nikkei Mechanical, first edition, second printing, Nikkei BP Co. Ltd. May 9, 1997, pages 77 to 79), points out that in fastening the bolt and nut, a first crest and a first root in the component fastening side intensively generate fastening force whereas the fastening force bore by a second crest and a second root and later is significantly small.

The nut described in the above JP-A-2006-118582 is very thick radial thickness, and so requires a considerably high torque to deform the concave on the component fastening side. Further, in this nut, the concave on the component fastening side functions as a spring; this is not so different from inserting a spring washer.

By the way, as pointed out by the above described non-Patent-Literature, the torque applied to the bolt/nut is mainly bore by the first crest and first root. Thus, simply enlarging the torque, it does not lead that the torque bored by the second and later crest and root becomes large. Namely, even if enlarging the fastening torque, the thread of the second crest and second root and later do not sufficiently contribute to the fastening force. Thus, a more efficiently locking structure has been demanded.

SUMMARY OF THE INVENTION

This invention has been accomplished in view of such a problem. This invention aims to provide a nut capable of preventing the loosening of a bolt and also to provide a female thread machining device and a female thread machining method capable of forming a female thread with a sufficient strength.

According to an aspect of the invention, there is provided a nut including:

a thread portion having a female thread;

a metallic plate portion having a base segment; and a hardness gradient portion provided between the thread portion and the metallic plate portion, wherein the thread portion, metallic plate portion and the hardness gradient portion are monolithic each other, a metallographic structure of the metallic plate portion differs from a metallographic structure of the thread portion and a hardness of the hardness gradient portion is lower than a hardness of the thread portion and lowers from the thread portion toward the metallic plate portion.

By providing such a hardness gradient portion, the thread portion has a sufficient strength so that thread-engagement with a bolt can be surely done. In addition, even if vibration is applied to the base segment or the thread portion, the hardness gradient portion can absorb vibration by its elasticity, thereby preventing locking of the bolt.

According to another aspect of the invention, it is adaptable that:

the thread portion contains bainite as a main component, the base segment contains cementite and ferrite as a main component, the hardness gradient portion contains cementite and ferrite as a main component and a metallographic structure of the ferrite in the hardness gradient portion becomes more microscopic from the thread portion to the metallic plate portion.

Here, the main component means to contain the component by nearly 95% or more.

According to another aspect of the invention, it is adaptable that at least an inner diameter portion of the hardness gradient portion is convex so as to project toward the thread portion.

Thus, the hardness gradient portion can function as a spring well.

According to another aspect of the invention, it is adaptable that the hardness gradient portion is smoothly connected to the metallic plate and the thread portion is projected from the hardness gradient portion.

According to another aspect of the invention, there is provided a nut including:

a female thread provided on a penetrating hole of the nut;

a base end portion which is provided at one axial end of the nut and has a seat surface adapted to be contact with a component to be fastened;

a tip end portion provided on the other axial end of the nut;

a diameter reducing side portion provided between the base end portion and the tip end portion and a diameter of which decreasing from the base end portion toward the tip end portion; and a concave segment provided on the seat surface of the base end portion so as to include an area where the penetrating hole is opened.

Since the concave segment is provided on the base side seat, in fastening the bolt, the concave segment is deformed and displaced owing to the axial force. This displacement influences the nearly entire zone of the nut; the sidelong diameter-reduced segment, which is wall-thinner toward the tip side, is likely to be deformed at the position nearer to the tip so that it is displaced to be diameter-reduced inwardly, thereby biting the bolt. Thus, the nut can effectively prevent loosening of the bolt by its simple structure.

According to another aspect of the invention, it is adaptable that in a cross section including a plane extending in a axial direction of the nut, an axial length of the diameter reducing side portion is at least half of an entire axial length of the nut and the diameter reducing side portion is in a curved shape.

Such a curve of the diameter reducing side portion corresponds to share distribution of fastening torque. Thus, the diameter of the nut can be reduced rationally.

Of course, according to a designing condition and machining condition, the entire length may not be formed in a curved shape. However, although in that case, if at least half or more of the entire length of the side is formed in a curved shape, the above effect can be obtained.

According to another aspect of the invention, it is adaptable that:

a square of the concave segment is equal to or more than a square of a circle of which radius is 1.2 times of a radius of the female screw and an axial length of the diameter reducing side portion is at least half of an entire axial length of the nut.

According to another aspect of the invention, it is adaptable that a radial thickness on the tip end portion is $\frac{1}{10}$ times or less as large as that of the base end portion.

In this way, if the wall thickness on the tip side is made sufficiently thin, the diameter of the nut is easily elastically reduced, thereby improving the biting effect for the bolt.

According to another aspect of the invention, it is adaptable that at least a part of the tip end portion is formed in a ring-line-shape.

In this way, if a part of the tip end portion is formed in the ring-line shape with no flat area, this portion is particularly likely to bite the bolt, thereby efficiently prevent falling off the bolt from the nut.

According to another aspect of the invention, it is adaptable that:

an entire outer circumference of the base end portion is connected to a metallic plate and in the concave segment, the metallic plate is formed in a convexly tapered shape toward the tip side.

In this way, if the concave segment is made of a metallic plate having a tapered shape, this segment serves as a spring so that the diameter of the nut can be further reduced.

According to further another aspect of the invention, there is provided a female thread machining device including:

a heating unit which heats a region where a female thread is to be formed in a metallic plate;

a machining tool which forms the female thread in the metallic plate;

a cooling unit which cools the machining tool;

a rotation-driving unit which rotates the machining tool; and an advance/retract driving unit which advances or retracts the machining tool.

By providing these heating unit and cooling unit, when the machining tool is inserted into a heated machined point, the machined point is abruptly cooled to be hardened in the metallographic structure, thereby forming a female thread with a high strength.

According to another aspect of the invention, it is adaptable that a chuck detachably holds the machining tool is provided on the female thread machining device, and the cooling unit indirectly cools the machining tool through the chuck.

According to such indirect cooling by the chuck, the machining tool can be designed in a simple structure requiring no cooling unit and can be replaced by another machining tool.

According to another aspect of the invention, it is adaptable that the cooling unit jets air onto the chuck or surrounding of the chuck to cool the machining tool.

The cooling unit of such a cooling type does not require a supply conduit or recovery conduit for cooling medium. Thus, the female thread machining device can be made simple.

According to another aspect of the invention, it is adaptable that the cooling unit passes liquid through a flow path to cool the machining tool. The cooling unit of such a liquid-cooling type can give a high cooling effect.

According to another aspect of the invention, it is adaptable that the machining tool includes:

a small diameter section provided at a tip end of the machining tool and adapted to form a hole in the metallic plate; and a tapping section provided continuously from the small diameter section and adapted to form the female thread in the hole.

According to such a machining tool, the female thread can be formed in a single step.

According to another aspect of the invention, there is provided a female thread machining method including:

a heating step of, by a heating unit, heating a region of a metal plate where a female thread is formed;

a cooling step of cooling a machining tool, which is adapted to form the female thread in the metallic plate, by a cooling unit; and a machining step including:

stopping heating the metal plate by the heating unit and continuing cooling the machining tool by the cooling unit;

inserting the machining tool into the metallic plate while rotating the machining tool; and forming the female thread by the machining tool while cooling the metallic plate by the machining tool.

By providing these heating unit and cooling unit, when the machining tool is inserted into a heated machined point, the machined point is abruptly cooled to be hardened in the metallographic structure, thereby forming a female thread with a great strength. Mutual timings of executing the heating step and cooling step other than the machining step do not particularly matter.

According to another aspect of the invention, it is adaptable that in the heating step, the metallic plate is heated to an austenitizing temperature or higher. Thus, the metallographic structure can be subjected to various kinds of heat treatment.

According to another aspect of the invention, it is adaptable that in the machining step, the metallic plate is cooled so that a metallographic structure of the metallic plate is changed through a bainite range.

According to another aspect of the invention, it is adaptable that the female thread machining method further includes a heat-radiating step performed after the machining step for cooling machining tool, and in the heat-radiating step, the metallic plate is cooled so that a metallographic structure of the metallic plate is changed through a bainite range.

Thus, bainite is deposited on the metallic plate, thereby providing a female thread with a sufficiently great strength.

DETAILED DESCRIPTION OF EXEMPLARY EMBODIMENTS OF THE PRESENT INVENTION

Hereinafter, referring to FIGS. 1 to 17 attached herewith, an explanation will be given of various embodiments of the nut according to this invention. A bushing 14 serving as the nut according to this invention is manufactured by a female thread machining device 10 and a female thread manufacturing method using this female thread machining device 10. First, an explanation will be given of the female thread machining device 10 and the female thread manufacturing method.

Figure 1:
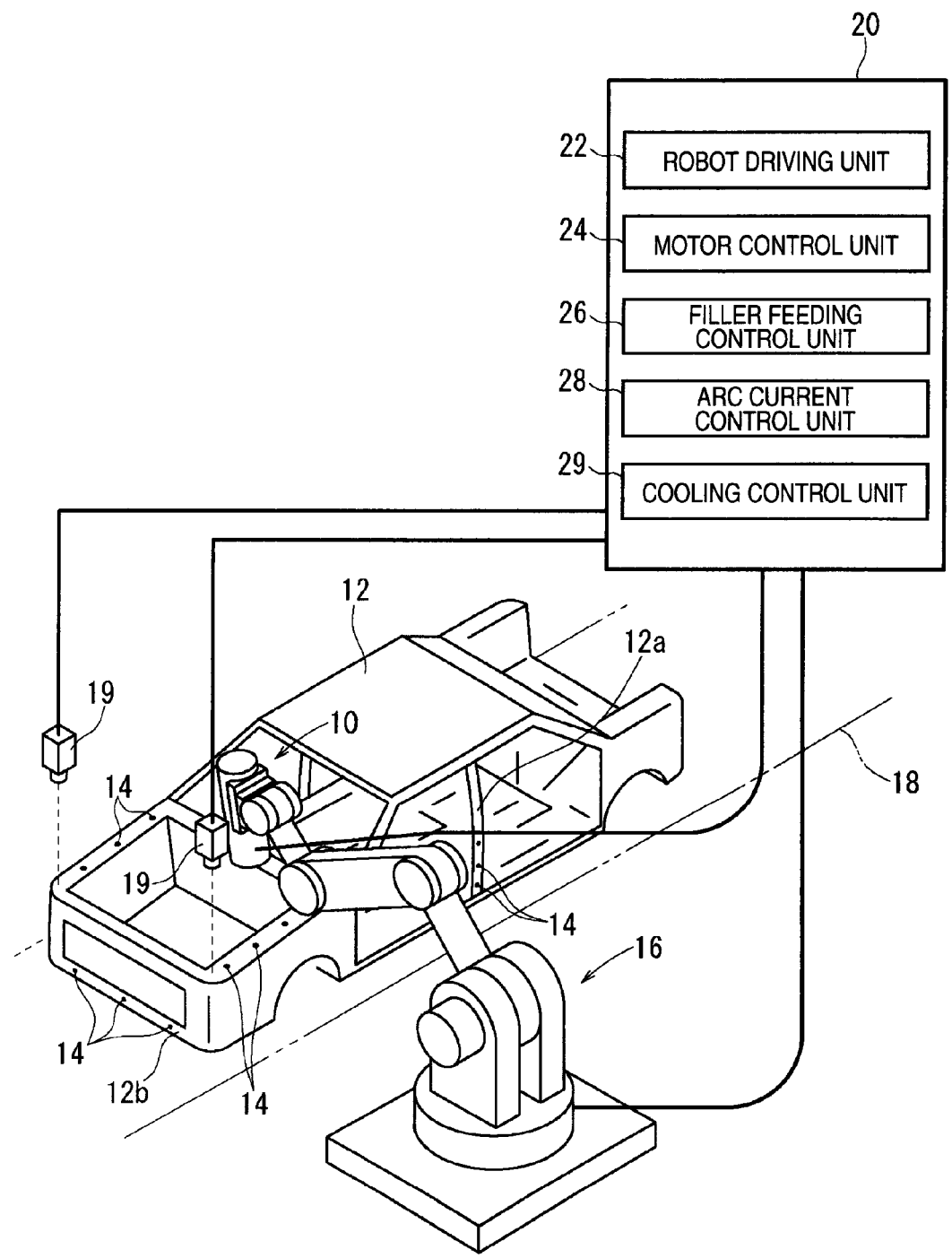
FIG. 1 is a perspective view of a robot equipped with a female machining device and a schematic functional block diagram of a controller.

As shown in FIG. 1, the female thread machining device 10 is a unit-type device for forming the bushings 14 at certain points in a frame (metallic plate) 12 before subjected to main painting process. The female thread machining device 10 is detachably provided at a tip end of a robot 16. In the bushing 14, a female thread 15 is formed (see FIG. 12). The robot 16 is an industrial articulated type so that the female thread machining device 10 can be set in an optional posture at arbitral position within an operating region of the robot 16. Thus, the female thread machining device 10 is arranged so as to be opposite to a door hinge portion 12a and a bumper beam portion 12b in the frame 12 so that bushings 14 can be formed on these portions.

The frame 12 is carried on a transporting line 18 and temporarily stopped in the vicinity of the robot 16 and its precise position is confirmed by a camera 19. After it is subjected to the machining of forming the bushings 14 by the female thread machining device 10, the frame 12 is transported to a station at the next step along the transporting line. Thereafter, a next non-machined frame 12 is carried in the vicinity of the robot 16.

The robot 16 and female thread machining device 10 are controlled by a controller 20. The controller 20 includes a robot driving unit 22 for operating the robot 16 on the basis of certain taught data; a motor control unit 24 for driving an ascending/descending motor (advance/retreat driving unit) 36 and a spindle motor (rotating/driving unit) 52 in the female thread processing device 10; a filler feeding control unit 26 for feeding a filler 48 (see FIG. 2); an arc current control unit 28 for discharging an arc from a TIG torch (arc heater 46); and a cooling control unit 29 for cooling a certain point of the female thread machining device 10. The controller 20 can recognize the position of the frame 12 and a bushing machining position P on the basis of an image acquired by the camera 19.

Figure 2:
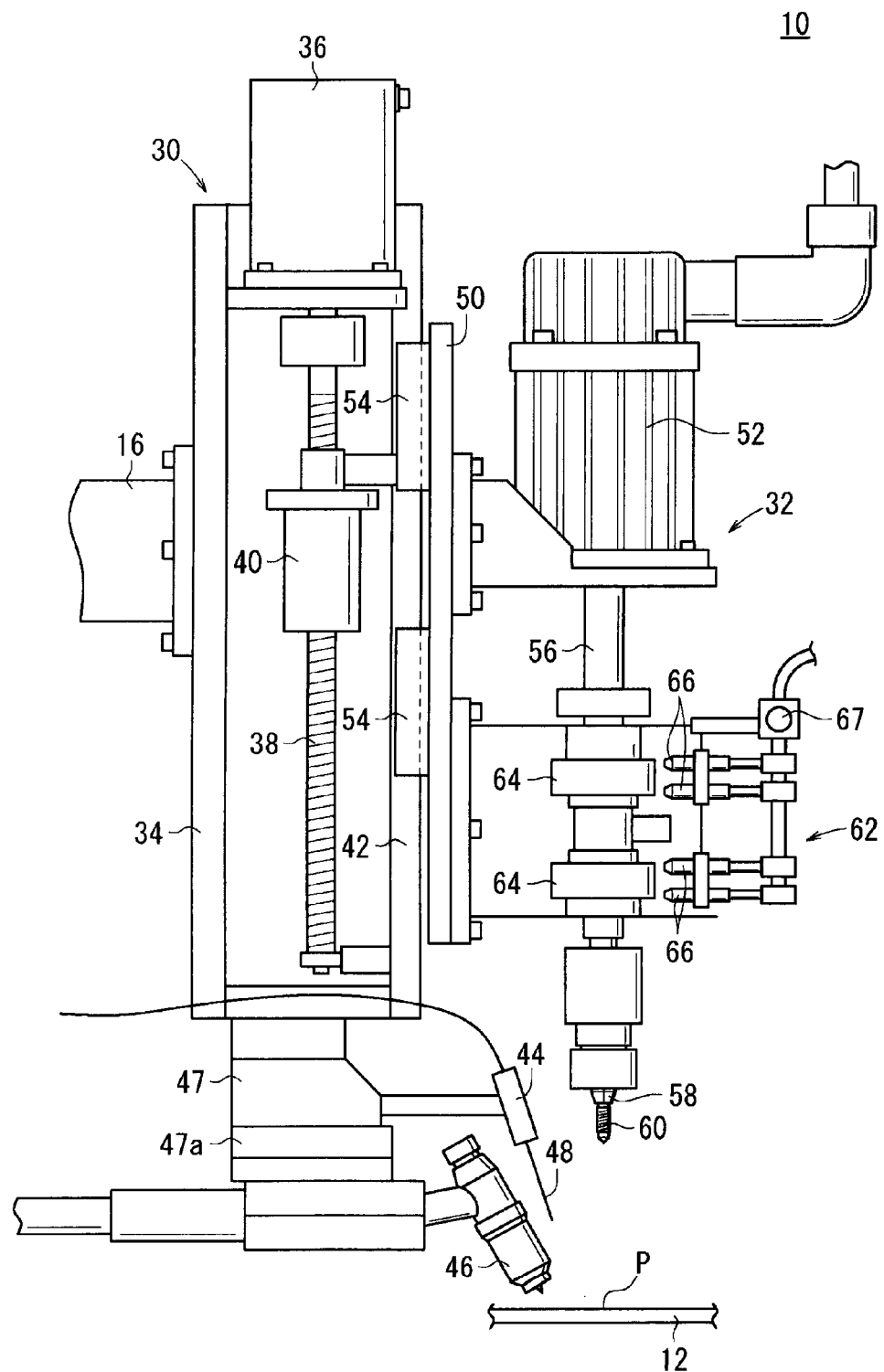
FIG. 2 is a sectional side view of a female thread machining device.

As shown in FIG. 2, the female thread machining device 10 mainly includes a base unit 30 and an ascending/descending unit 32 which ascends/descends the base unit 30. The robot 16 is connected to the side of the base unit 30.

The base unit 30 includes a base body 34, an ascending/descending motor 36, a ball screw 38, a ball nut 40, a guide rail 42, a filler feeding machine 44 and an arc heater (heating unit) 46 (e.g. TIG torch). The base body 34 elongates in longitudinal direction and has the ascending/descending motor 36 at the upper end. The ball screw 38 is connected to the ascending/descending motor 36, extended downwards and held rotatably. At the end of the base body 34, the guide rail 42 is provided so as to extend vertically and opposes to the ascending/descending unit 32. The guide rail 42 and ball screw 38 are in parallel to each other.

The ball nut 40 is thread-engaged with the ball screw 38 and connected to the ascending/descending unit 32 so that it can cause the ascending/descending unit 32 to ascend/descend by the rotation of the ascending/descending motor 36. The quantity of ascent/descent of the ascending/descending unit 32 is fed back using a sensor not shown.

The filler feeding machine 44 is oriented to the bushing machining position P. The filler feeding machine 44 feeds the filler 48 toward the bushing machining position P under the operation of the filler feeding control unit 26. The arc heating machine 46 is fixed to the lower end of the base body 34 by a bracket 47. The arc heating machine 46 executes arc discharge for the bushing machining position P under the operation of the arc current control unit 28 thereby to heat the bushing machining position P. The bracket 47 has a sliding mechanism 47a for moving the arc heating machine 46.

The ascending/descending unit 32 includes an ascending/descending base body 50, a spindle motor 52, a rail engaging portion 54, a rotating rod 56, a chuck 58, a machining tool 60 and a cooling unit (cooling portion) 62. The portion cooled by the cooling unit 62 may be provided with a fin to enlarge the area to enhance the cooling effect.

The ascending/descending base body 50 is ascendably/descendably engaged with the guide rail 42 by two upper and lower rail engaging portions 54 and connected to the ball nut 40 at a predetermined point. At the upper end, the ascending/descending base body 50 is provided with the spindle motor 52 while downwardly oriented. The spindle motor 52 is designed to be capable of controlling the number of revolutions under the operation of the motor control unit 24 and is rotatable synchronously with the ascending/descending motor 36.

The rotating rod 56 is connected to the spindle motor 52, extended downwards and held rotatably. At the lower end, the rotating rod 56 is provided with the chuck 58 for holding the machining tool 60.

The cooling unit 62 is provided at a midpoint of the rotating rod 56 and contains a bearing block 64 pivoting the rotating rod 56. The cooling unit 62 is supplied with compressed air from air supply ports 66 and can jet the compressed air to the rotating rod 56 and bearing rock 64 so as to cool them. The compressed air thus jet is discharged externally as it is. The air supply ports 66 have e.g. a plurality of nozzles and have a regulating valve 67 capable of regulating the quantity of air to be supplied and of opening/closing the flow path. The regulating valve 67 is supplied with the cooled compressed air.

Such an air cooling type of cooling unit 62 does not require a supply tube passage or recovery tubular path for the cooling medium and the structure can be made simple.

Figure 3:
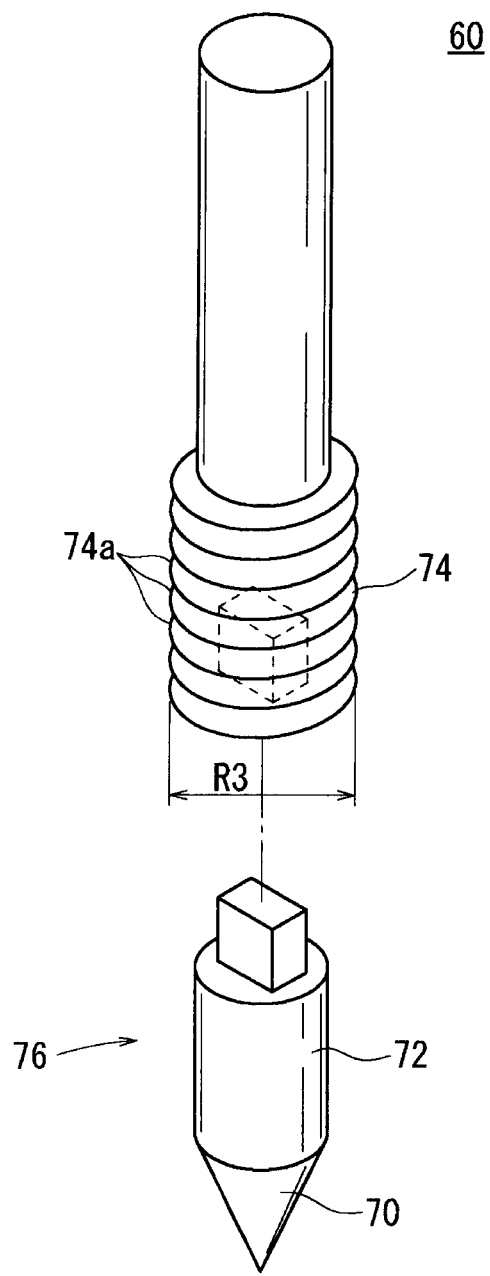
FIG. 3 is an exploded perspective view of a machining tool.

As shown in FIG. 3, the machining tool 60 includes a small diameter section 70 at the tip end, a cylinder section 72 continuously provided at upward of the small diameter section 70 and a tapping section 74 continuing further upward. The small diameter section 70 is formed in a conical shape of which diameter gradually reduces towards downward. The small diameter section 70 at the upper end thereof has the largest diameter equal to that of the cylinder section 72. The small diameter section 70 serves to form a hole 100 (see FIG. 7) in the frame 12 and the cylinder section 72 serves to stabilize the shape of the hole 100. The small diameter section 70 and the cylinder section 72 are unified in a lower hole forming section 76. The tapping section 74 serves to form a female thread in the hole 100. The tapping section 74 has a helical projection 74a having a larger diameter than the cylinder section 72. According to a design condition and machining condition, without providing the cylinder section 72, the tapping section 74 may be provided so as to reach to an immediately above the small diameter section 70 or to a point of the upper end of the small diameter section 70.

Further, the small diameter section 70 may be subjected to dulling processing for enhancing the frictional effect for the frame 12 and coating by a super-hard material for increasing the strength.

The tapping section 74 and lower hole forming section 76 are detachably constructed so that only either one of them is replaceable individually. It is needless to say that the tapping section 74 and the lower hole forming section 76 may be integrated. The machining tool 60 is formed of a metal such as high speed steel.

The female machining device 10 has a plurality of negative electrode plates 69 (see FIG. 5) arranged around the bushing machining position P. Otherwise, in place of the negative electrode plates 69, a grounding line 69a (see FIG. 17) may be provided on a truck, a jig, a machining stand, etc.

Next, an explanation will be given of a female thread machining method for forming the bushing 14 (see FIG. 12) at the bushing machining position P of the frame 12 using the female thread machining device 10 constructed as described above. In the following explanation, it is assumed that the processing will be executed in the order of indicated step numbers.

Figure 4:
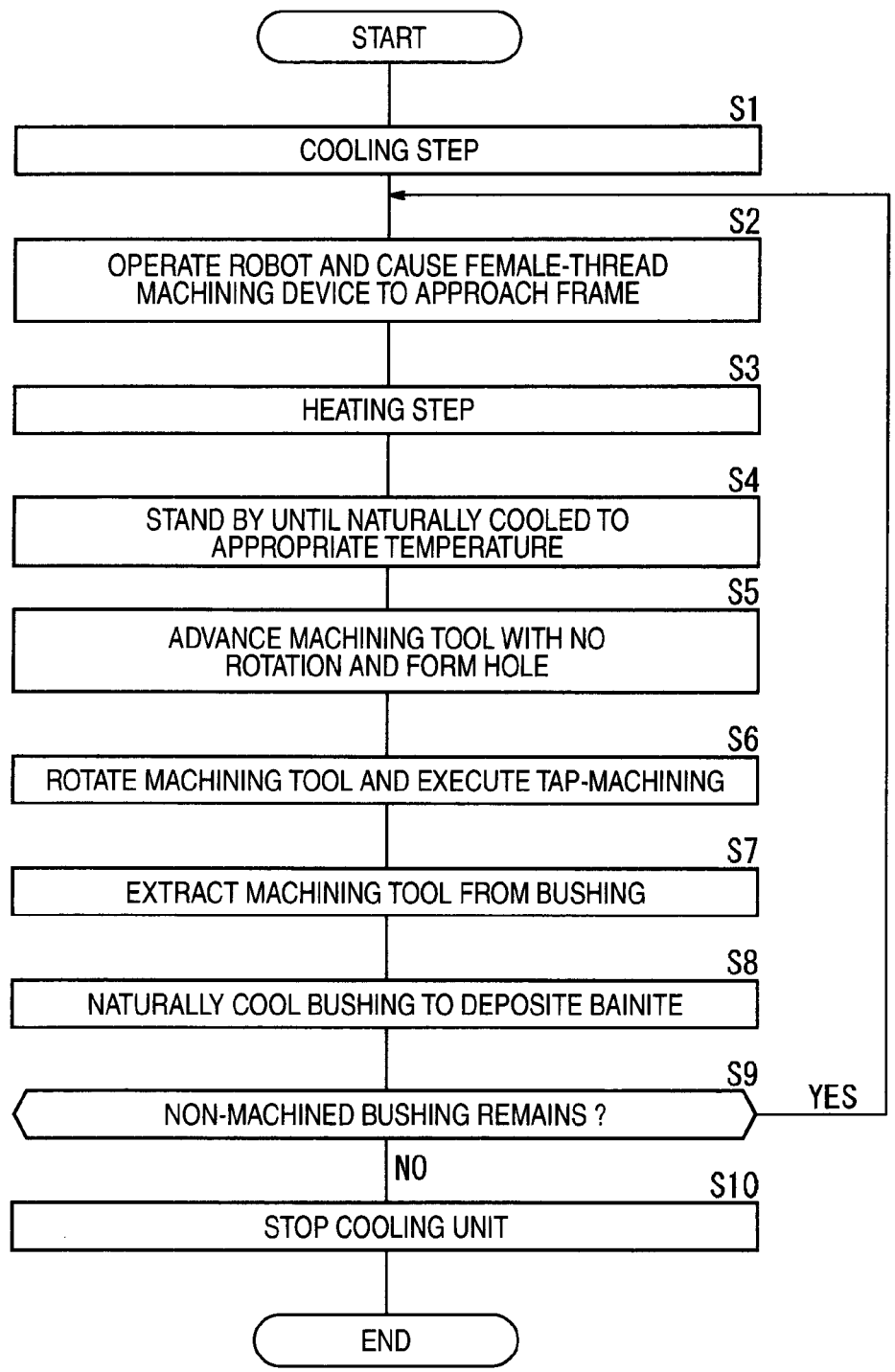
FIG. 4 is flowchart showing procedures of a female thread machining method.

Referring to FIG. 4, in step S1 (cooling step), under the operation of the cooling control unit 29, cooled compressed air is supplied to the cooling unit 62 thereby to cool the rotating rod 56 and bearing block 64. This cooling step is continuously executed in a series of plural times of female machining so that the machining tool 60 is indirectly cooled through the chuck 58. By such indirect cooling through the chuck 58, the machining tool 60 can be formed in a simple structure not requiring the cooling means. In addition, replacement of the machining tool 60 can be facilitated.

At the first time of female thread machining, since the machining tool 60 is at a normal temperature without executing the cooling step, the cooling may be started from the second time of machining.

This step S1 is processing for appropriately cooling the machining tool 60 heated in step S6 described later; the machining tool 60 is cooled to the temperature not higher than 600° C., e.g. about 500° C. This cooling processing does not require strict temperature management. Namely, with a suitable constant quantity of air based on an experiment or experience having been continuously jet to the rotating rod 56 and bearing block 64, the machining tool 60 may be cooled to the temperature not higher than 600° C. immediately before step S6.

According to the result of the experiment executed by the inventors of the present invention, the following facts have been found out. Namely, even where the room temperature changes to some extent, as the cooling for the rotating rod 56 and bearing block 64 by the cooling unit 62, as long as a suitable constant quantity of air has been continuously jet to the rotating rod 56 and bearing block 64, a bushing 14 having a satisfactory female thread 15 can be obtained without executing feedback control and special adjustment according to the room temperature.

In step S2, under the operation of the robot driving unit 22, the robot 16 is operated so that the female thread machining device 10 approaches the frame 12 to bring the negative electrode plates 69 into contact therewith. Where a grounding line is provided on a truck, a jig, a machining stand, etc., the negative electrode plates 69 are not necessary. In this case, a prescribed bushing machining position P is located on an axis along which the machining tool 60 advances/retreats.

Figure 5:
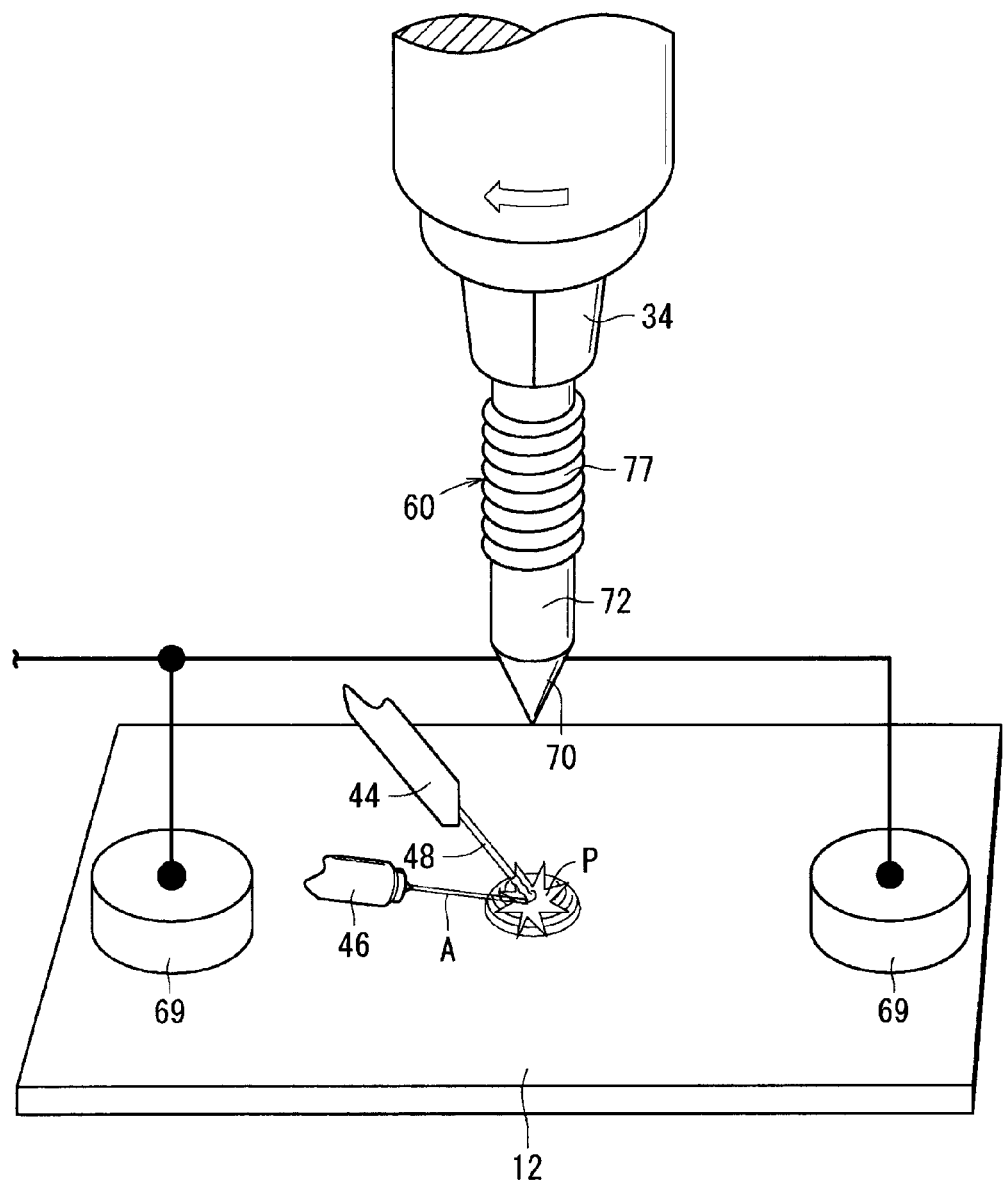
FIG. 5 is a view for explaining heating process using an arc discharge.

In step S3 (heating step), as shown in FIG. 5, under the operation of the filler feeding control unit 26, the filler 48 is fed from the filler feeding machine 44 and form an excessive material so as to thicken the thickness thereof. In addition, under the operation of the arc current control unit 28, a high voltage is applied to the arc heater 46 to generate an arc A. With the arc heater 46 previously moved to the vicinity of the bushing machining position P, the arc is discharged at the bushing machining position P to preliminarily heat and soften thereon. The bushing machining position P is heated quickly by the arc A. After a predetermined time elapses, application of the high voltage is stopped to vanish the arc A. At the bushing machining position P, the frame 12 and the thickened filler 48 are heated to reach e.g. 1200° C.

After a certain quantity of the filler 48 is fed, the remainder is slightly pulled back to retreat into the filler feeding machine 44. If the plate at the bushing machining position P is thick, thickening by supply of the filler 48 may be omitted.

Figure 6:
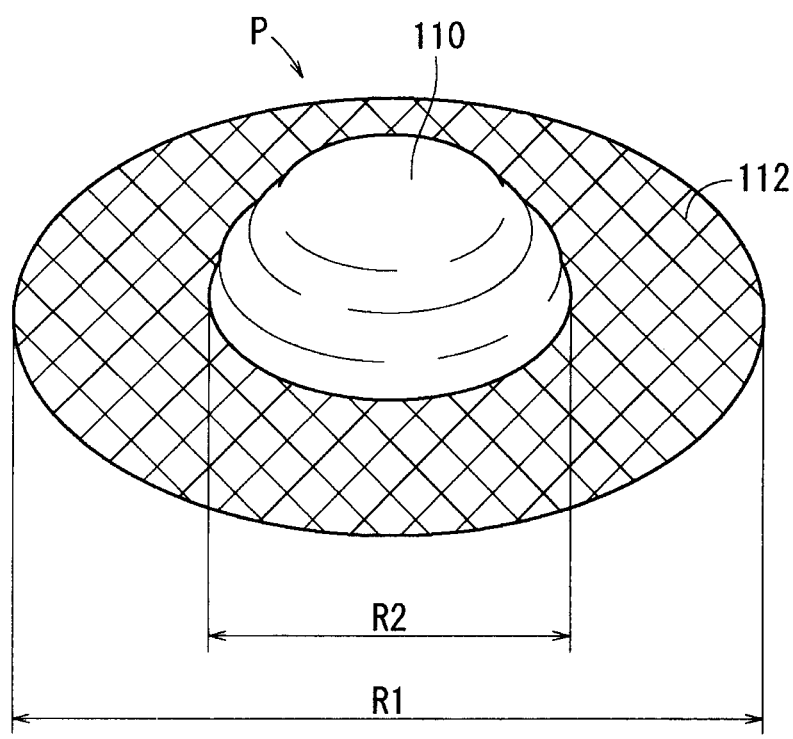
FIG. 6 is a perspective view of a thickened section and thermal-influence section formed at a bushing machining position.

At this time, at the bushing machining position P, as shown in FIG. 6, formed are an appropriate thickened section 110 and a thermal-influence section 112 containing the thickened section and located on the circumference thereof. The thermal-influence section 112 refers to an area with a surface color changed owing to temperature increase by heating.

The diameter R1 of the thermal-influence section 112 is preferably 1.6 to 1.7 times or so as long as the upper diameter R2 of the thread portion (see FIG. 12) described later.

In step S4, the female thread machining is stopped until the bushing machining position P is naturally cooled to a suitable temperature. At this time, the suitable temperature of the bushing machining position P refers to the temperature not lower than an austenitizing temperature, e.g. about 900° C. In the previous step S3, the heating may be stopped at 900° C. before reaching to 1200° C. However, once the heating is executed to 1200° C. higher than 900° C. and then cooled, the machining position P can be set at 900° C. for a shorter time and the thermal-influence section 112 can be assured in an appropriately wide area.

Figure 7:
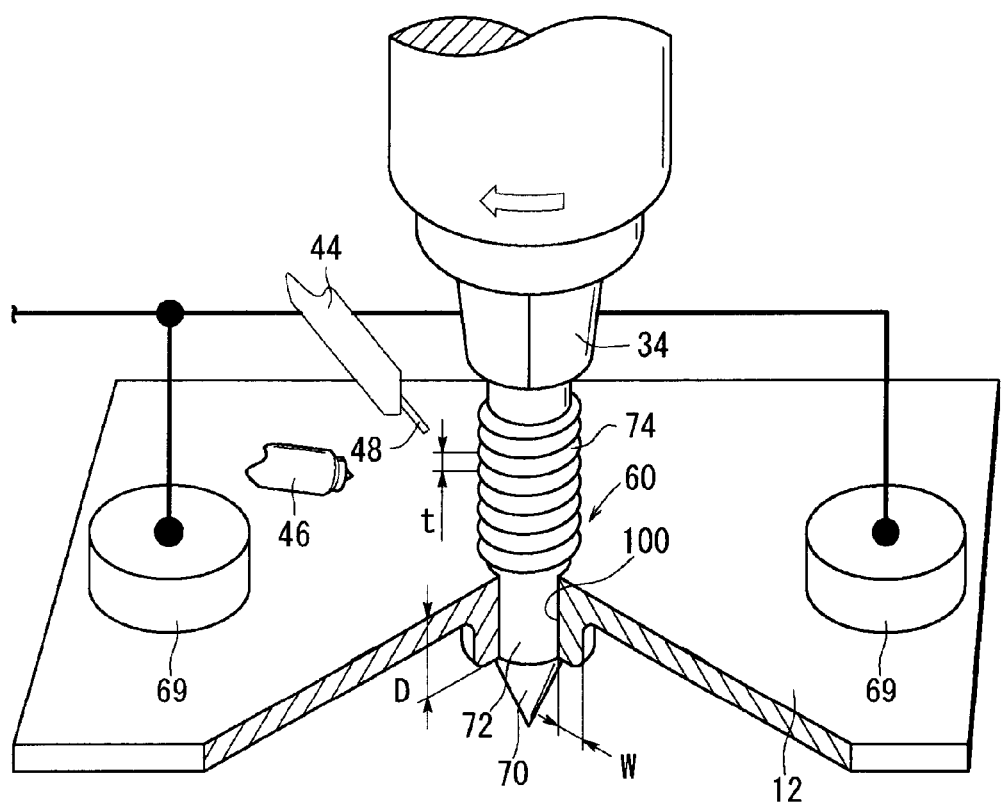
FIG. 7 is a view for explaining forming process of a hole at a bushing machining position.

In step S5, as shown in FIG. 7, the machining tool 60 is advanced with no rotation to make the hole 100. The hole 100 is first formed by the tip end of the small diameter section 70 and enlarged by the conical face thereof. Further, passing the cylinder section 72 through the hole 100 stabilizes its shape.

Figure 8:
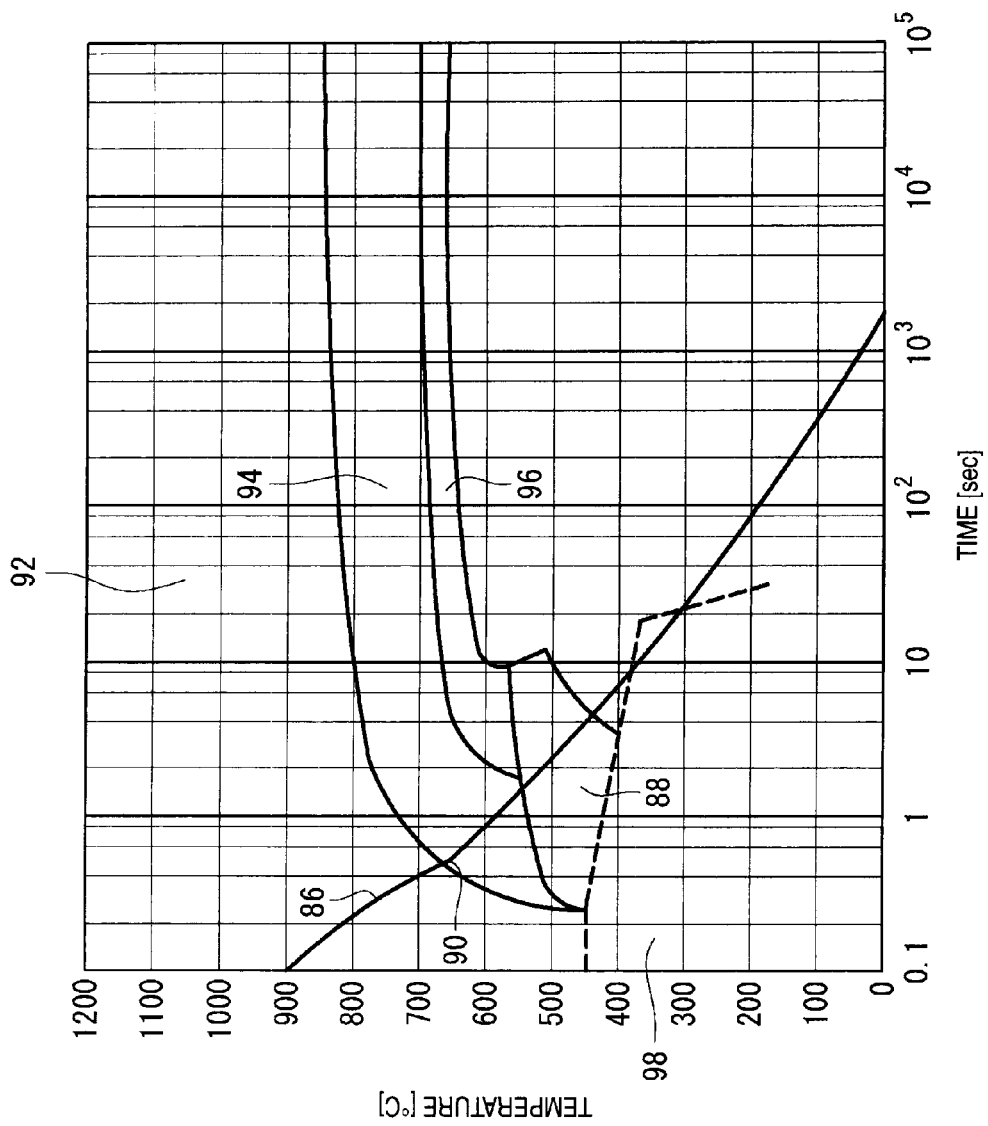
FIG. 8 is a continuous cooling status diagram of carbon steel containing C of 0.13% and Mn of 0.56%.

At this time, the bushing machining position P is at about 900° C. whereas the machining tool 60 is at 600° C. or lower, e.g. 500° C. Therefore, the bushing machining position P is abruptly cooled and this operation functions as "quenching". Assuming that the cooling time is about 0.5 sec, as shown in FIG. 8, a CCT curve (continuous cooling transformation diagram) 86 passes through the range immediately above a bainite range 88. FIG. 8 shows a continuous cooling phase diagram of carbon steel having a composition of 0.13% of C and 0.56% of Mn. Where the metal having a composition other than the above composition is employed, the cooling condition may be set on the basis of the continuous cooling phase diagram for the pertinent composition.

The abrupt cooling processing of the frame 12 by the machining tool 60 is continuously executed until the temperature of the machining tool 60 increases owing to temperature reduction of the frame 12 and the temperature of the frame 12 decreases to 600° C. to 700° C. or so while they are kept in contact with each other. Actually, the cooling is executed in step S5 and also the subsequent step S6. The range of 600° C. to 700° C. or so is a ferrite range. By the subsequent air cooling, the metallographic structure of the bushing machining position P changes so as to pass the bainite range. The abrupt cooling to 600° C. to 700° or so can be realized by a simple cooling equipment.

Further, although the cooling equipment is upsized, it is adaptable to rapidly cool the frame 12 by the forcible cooling so as to reach directly to the bainite range, and the working efficiency can be improved.

In the meantime, the machining tool 60 generates a slight temperature rise owing to the heat from the frame 12. However, since the machining tool 60 is continuously cooled by the cooling unit 62 through the chuck 58, the machining tool 60 does not cause an excessive temperature rise so that thermal expansion is retrained, thereby keeping a high machining accuracy.

Figure 9:
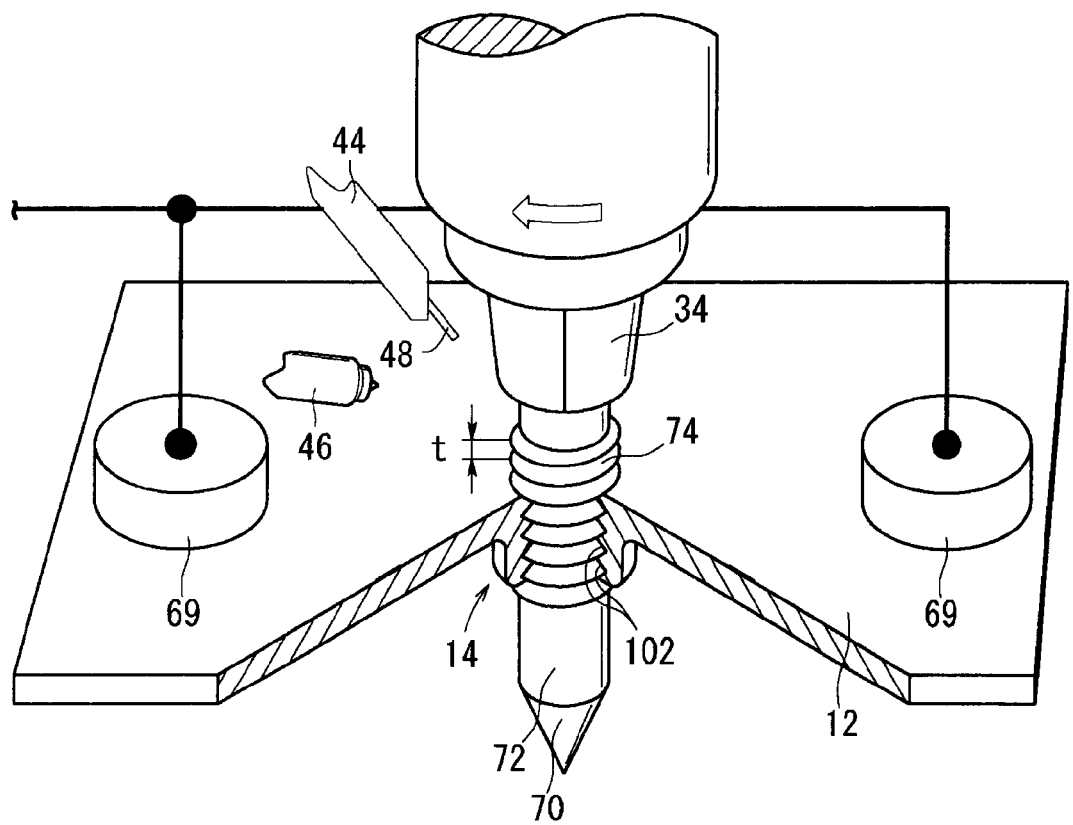
FIG. 9 is a view for explaining forming process of a female thread by a tapping section.

After the cylinder section 72 is inserted into the hole 100 without rotation in step S6, the ball screw 38 and machining tool 60 are rotated by the spindle motor 52. Further, the number of revolutions of the ascending/descending motor 36 is synchronously controlled so that when the machining tool 60 is rotated by one turn, the machining tool 60 advances by the pitch t (see FIG. 7) of the helical projection 74a of the tapping section 74. Thus, as shown in FIG. 9, the workpiece is tap-machined so that the helical projection 74a is thread-engaged with the hole 100, thereby forming the bushing 14 having the female thread 15.

The time while forcible cooling is executed in steps S6 and S7 (time while the machining tool 60 is kept in contact with the workpiece, i.e. the time from when the hole is formed and tap-machined to when the machining tool 60 is extracted) is e.g. about 1.5 sec.

After step S5, with the machining tool 60 being inserted in the hole 100, the machining processing is advanced to the subsequent step S6. Therefore, these steps S5 and S6 can be regarded as substantially one step. As a matter of course, there is no need of replacing the machining tool 60 in step S5 and step S6.

In step S7, the spindle motor 52 and ascending/descending motor 36 are rotated reversely so that the machining tool 60 is extracted from the bushing 14. In the meantime, the spindle motor 52 and ascending/descending motor 36 are synchronized with each other so that when the machining tool 60 rotates by one turn, it retreats by the pitch t. After the tapping section 74 has been extracted from the bushing 14, the machining tool 60 may be retreated at high speed.

By extracting the machining tool 60 from the bushing 14, forcible cooling by the machining tool 60 is ended. Thereafter, the machining tool 60 is continuously cooled by the cooling unit 62.

In step S8 (heat radiating step), the bushing 14 is naturally air-cooled. Thus, like a range lower than a folding point 90 in the CCT curve 86 in FIG. 8, the cooling advances moderately so that the frame 12 is cooled through the bainite range 88. Accordingly, the bainite is deposited on the frame 12 thereby to provide the female thread with a sufficient strength. The bainite is a metallographic structure in which fine cementite are scattered within ferrite and has a high hardness and toughness. It does not particularly problematic whether or not the CCT curve 86 passes a perlite range 96.

Further, since the metal plate is once heated to the austenitizing temperature, various kinds of heat treatment can be applied to the metal plate in accordance with a design condition. In FIG. 8, reference numerals 92, 94, 96 and 98 in this order denote the austenite range, ferrite range, perlite range and martensite range.

In step S8, using the heat absorbing means other than the machining tool 60, heat radiation of the bushing 14 may be promoted (heat radiating step).

Thereafter, the robot 16 is operated to cause the female thread machining device 10 to release the frame.

In step S9 (may be done concurrently with step S8), it is confirmed whether or not any non-machined bushing remains. If there is any non-machined bushing, the female thread machining device 10 is moved to the subsequent bushing machining position P. The processing is returned to step S2, and in the same procedure as described above, the machining is continued.

Where the machining of all the bushings 14 has been completed, the cooling unit 62 is stopped (step S10). Thus, the processing shown in FIG. 4 is ended.

In accordance with the female thread machining device 10 and female thread machining method described above, by providing the arc heater 46 and cooling unit 62, when the machining tool 60 is inserted in a heated bushing machining position P, the bushing machining position P is abruptly cooled so that the metallographic structure will be hardened, and the female thread 15 having high strength is formed.

Further, the machining tool 60 is pressed without rotation on the bushing machining position P so that the hole 100 is made at the bushing machining position P using the small diameter section 70; thereafter, the machining tool 60 is rotated and further inserted into the bushing machining position P without being extracted from the hole 100 so that female thread 15 is formed in the hole 100 using the tapping section 74. Thus, the bushing 14 can be formed in substantially one step, thereby improving the working efficiency.

Figure 10:
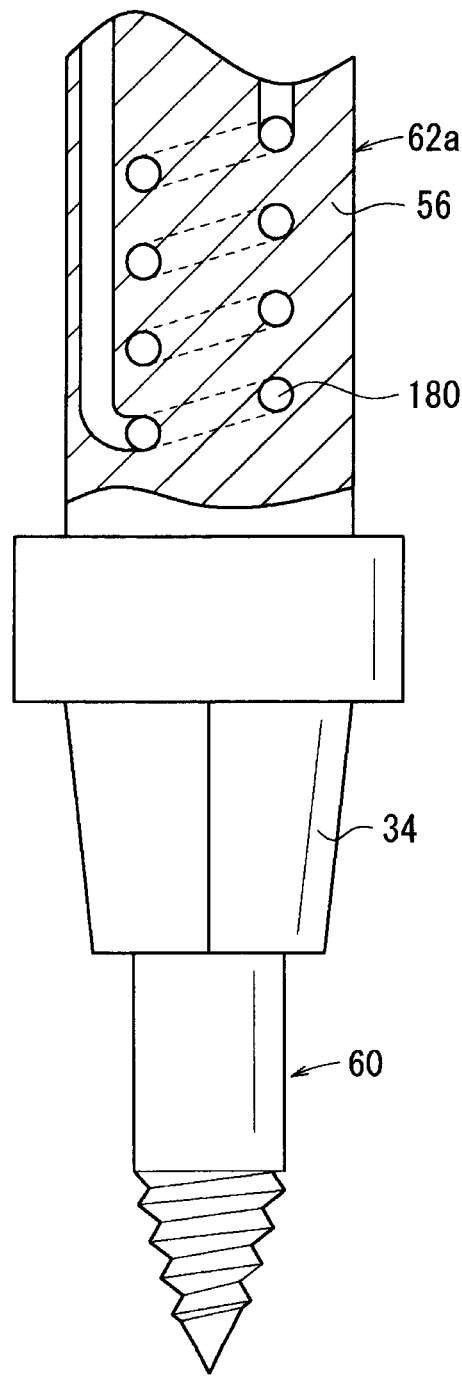
FIG. 10 is a schematic sectional view of a liquid-cooling unit.

The cooling unit 62 should not be limited to an air-cooling type but may be a liquid-cooling type such as a cooling unit 62*a* shown in FIG. 10. In the cooling unit 62*a*, a rotating rod 56 is provided in a flow passage 180 through a rotation joint (not shown), and liquid is circulated in the flow path 180 while rotating the rotating rod 56. The liquid absorbing the heat from the rotating rod 56 is radiated by a radiator (not shown) and then circulated in the flow path 180. According to this structure, high cooling efficiency is achieved.

Figure 11:
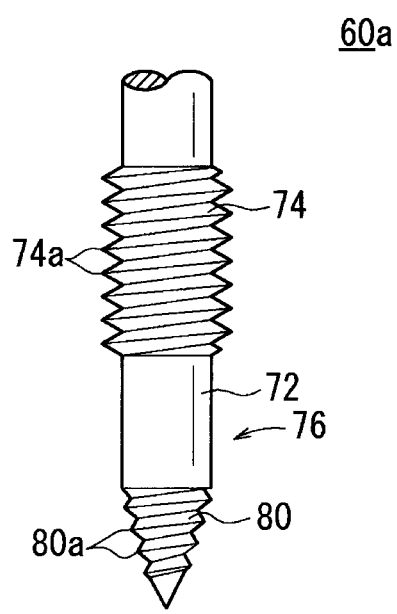
FIG. 11 is a side view of a modification of a machining tool.

The machining tool 60 may be replaced by a machining tool 60*a* as shown in FIG. 11. The cylinder section 72 and tapping section 74 in the machining tool 60*a* are the same as those in the machining tool 60 described above. The machining tool 60*a* is different from the machining tool 60 in that it is provided with a tip 80 at the region corresponding to the small diameter section 70. The tip 80 has a helical projection 80*a* added to the small diameter section 70.

Further, the direction of the helix in the helical projection 80*a* is the same as that in the helical projection 74*a* in the tapping section 74, but they may be reverse to each other according to a design condition.

Next, an explanation will be given of the bushing 14 having a female thread 15 in its inner hole. This bushing 14 is formed by the female thread machining device 10 and female thread machining method described above.

Figure 12:
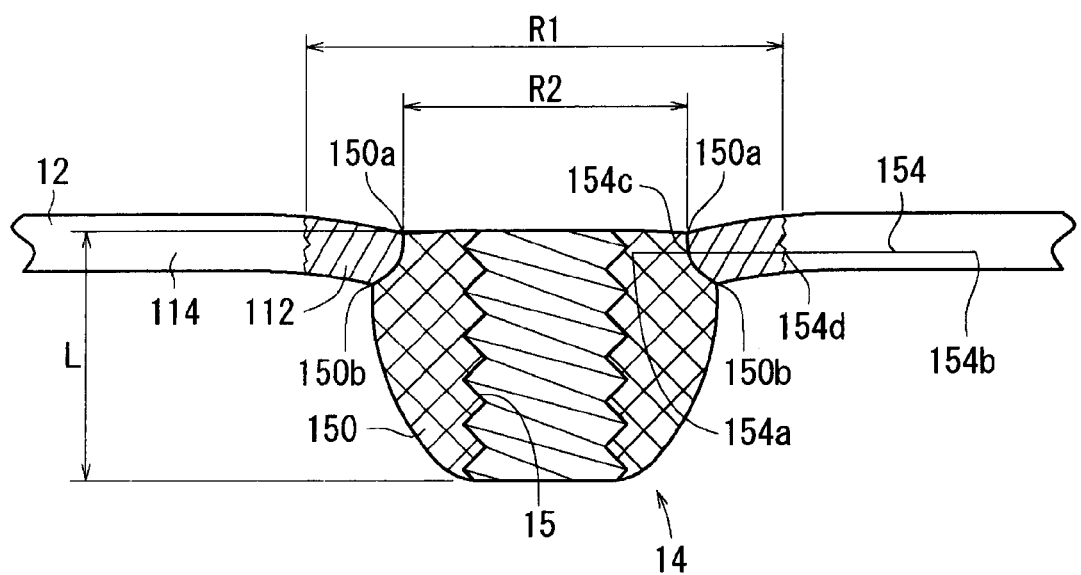
FIG. 12 is a view showing a cut model of a bushing.

FIG. 12 shows a cut model of the bushing 14. As shown in FIG. 12, the bushing 14 includes a thread portion 150 and a thermal-influence section 112. A base segment 114 is located outside the thermal-influence section 112. The thread portion 150, thermal-influence section 112 and the base segment 114 are different from one another in their metallographic structure and they can be distinguished from one another by a difference in their colors on the cut face. On an inner wall of the thread portion 150, the female thread 15 is formed.

The thread portion 150 is mainly formed of the thickened portion by the filler 48, thus the metallographic structure thereof seems to be greatly thermally influenced and is rich in bainite (bainite of 95% or more is contained as a main component). The thread portion 150 projects downwardly and its boundary with the thermal-influence section 112 is substantially curved at an upper connecting point 150*a* and a lower connecting point 150*b*.

The thermal-influence section 112 is considered to be an area which contains a small quantity of filler 48 is mixed to the frame 12 of a base segment and is thermally influenced to a certain extent. In this area, spherical cementite and fine ferrite are mixed with each other. In the metallographic structure of the thermal-influence section 112, as a main component, cementite and the ferrite whose structure is made more microscopic at a position nearer to the base segment are contained by 95% or more. In the thermal-influence section 112, the metallographic structure of the ferrite is made more microscopic at a position nearer to the inside thread portion 150.

The thermal-influence section 112 has a shape inclining slightly downward toward the inside thread portion 150 and is connected smoothly and nearly horizontally with the base segment 114.

Namely, at least the inner diameter of the thermal-influence section 112 is convex shape projecting toward the direction in which the thread portion 150 projects (downward in FIG. 12) so as to enhance the spring function of the thermal-influence section 112. This will be easily understood from, for example, the fact that an accordion like member is more likely to flex than a linear member.

The base segment 114 is an area whose metallographic structure does not almost change from the original frame 12. In this area, spherical cementite is mixed in coarse ferrite. In other words, cementite and ferrite are contained by 95% or more as a main component.

The upper diameter R2 of the thread portion 150 and the thread length L thereof are in an inverse proportion to each other; as the one becomes long, the other becomes short. In order to enhance the strength of the thread portion 150, it is more preferable to increase the thread length L of the thread portion 150 than to increase the diameter R2 of upper part of the thread portion 150. Therefore, it is not necessary to excessively increase the diameter R2 of the upper part of the thread portion and the diameter R2 is preferably 1.3 to 1.5 times or so as long as the diameter R3 of the machining tool 60 (see FIG. 3). The diameter R is adjustable by the supplied quantity of the filler 48 or heating temperature.

Further, the thermal-influence section 112 is an area connecting the base segment 114 and the thread portion 150, which desirably has appropriate toughness and elasticity. As previously described, the diameter R1 of the thermal-influence section 112 is preferably 1.6 to 1.7 times or so as long as the diameter R2 of the upper part of the thread portion.

As described later, the thermal-influence section 112 has a tough property and so functions as a spring when a bolt 168 is fastened to the thread portion 150. Further, the thermal-influence section 112 is harder than the base segment 114 so that the base segment 114 will be deformed so as to follow elastic deformation of the thermal-influence section 112.

Figure 13:
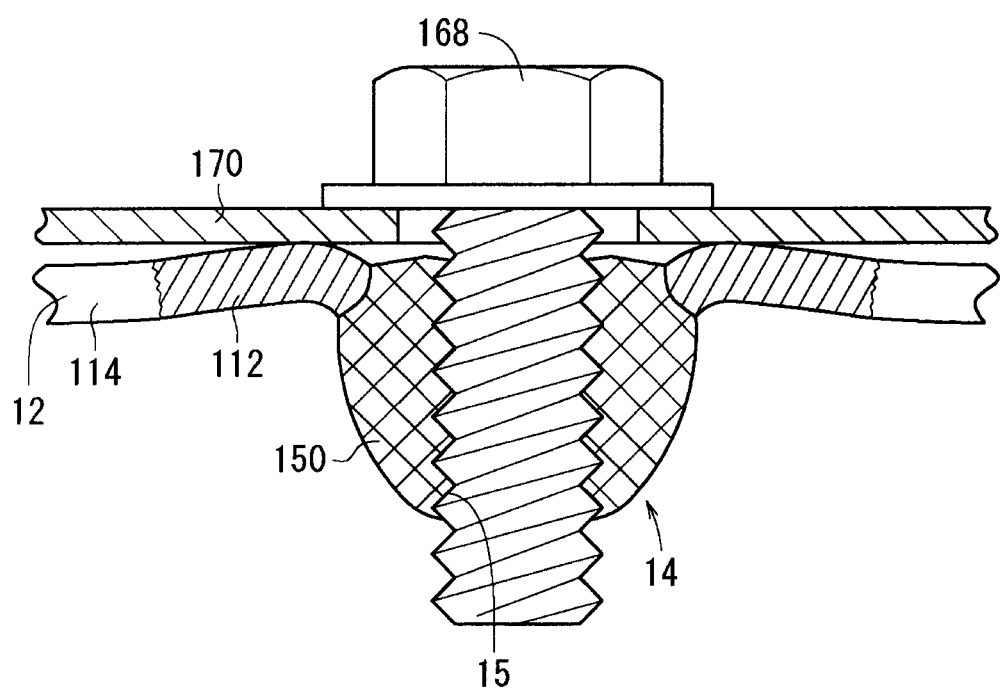
FIG. 13 is a view showing a deformation of a thermal-influence section and a base segment when a bolt is thread-engaged with a thread portion if the thermal-influence section is excessively wide.

Now, as shown in FIG. 13, if the thermal-influence section 112 is excessively wide, the base segment 114 will be pushed downward so that a contact area between an upper plate 170 and the frame 12 cannot be sufficiently ensured.

Figure 14:
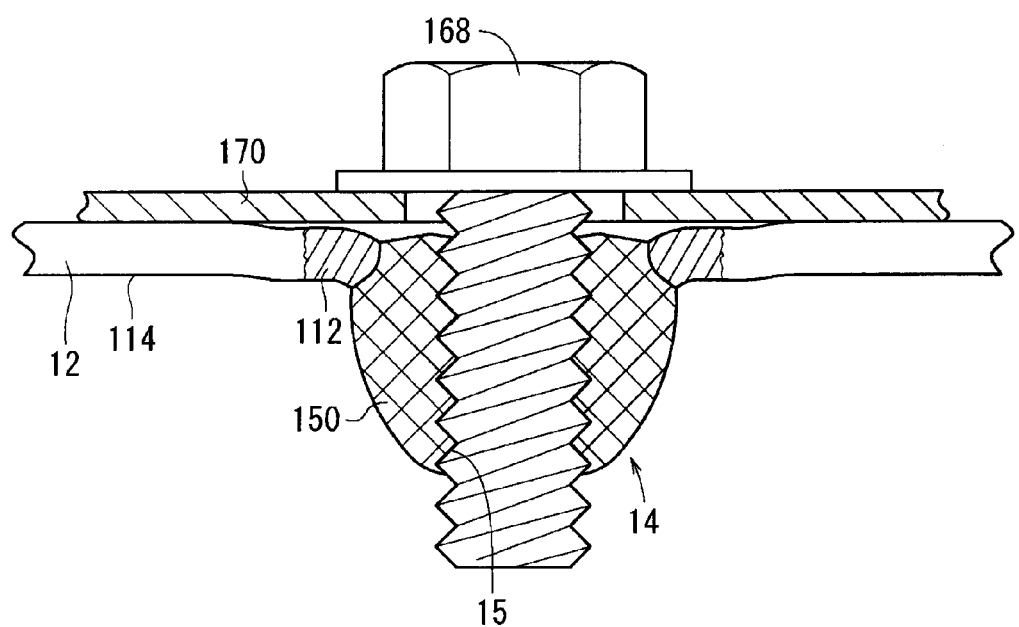
FIG. 14 is a view showing a deformation of a thermal-influence section and a base segment when a bolt is thread-engaged with a thread portion if the thermal-influence section is appropriately wide.

On the other hand, if the diameter R1 of the thermal-influence section 112 is 1.6 to 1.7 times or so as long as the diameter R2 of the upper part of the thread portion, as shown in FIG. 14, the base segment 114 is restrained from being pushed downward so that the contact area between the upper plate 170 and the frame 12 can be sufficiently ensured.

Regarding the hardness of the bushing 14, the inventors of this invention have executed a Vickers hardness test on the bushing 14 at pitches of 0.5 mm along a test path 154. The test path 154 is a linear path in the radial direction from the innermost point 154a of the thread portion 150 in the bushing 14 to a point 154b sufficiently far from the thermal-influence section 112 in the base segment 114. The boundaries among the thread portion 150, thermal-influence section 112 and base segment 114 are referred to as a boundary 154c and boundary 154d. The test result is shown in FIG. 15.

Figure 15:
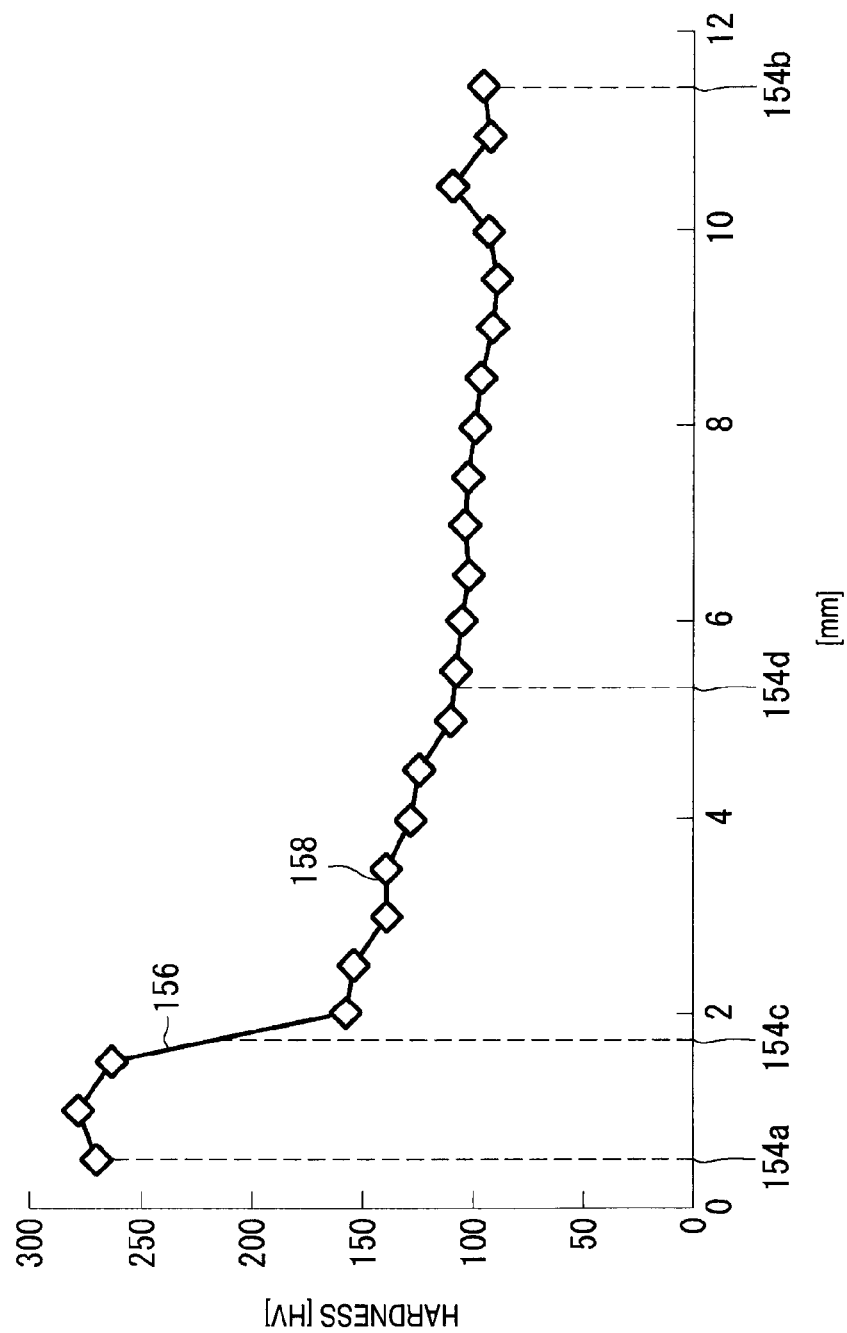
FIG. 15 is a graph showing results of a Vickers hardness test on a bushing.
Figure 16:
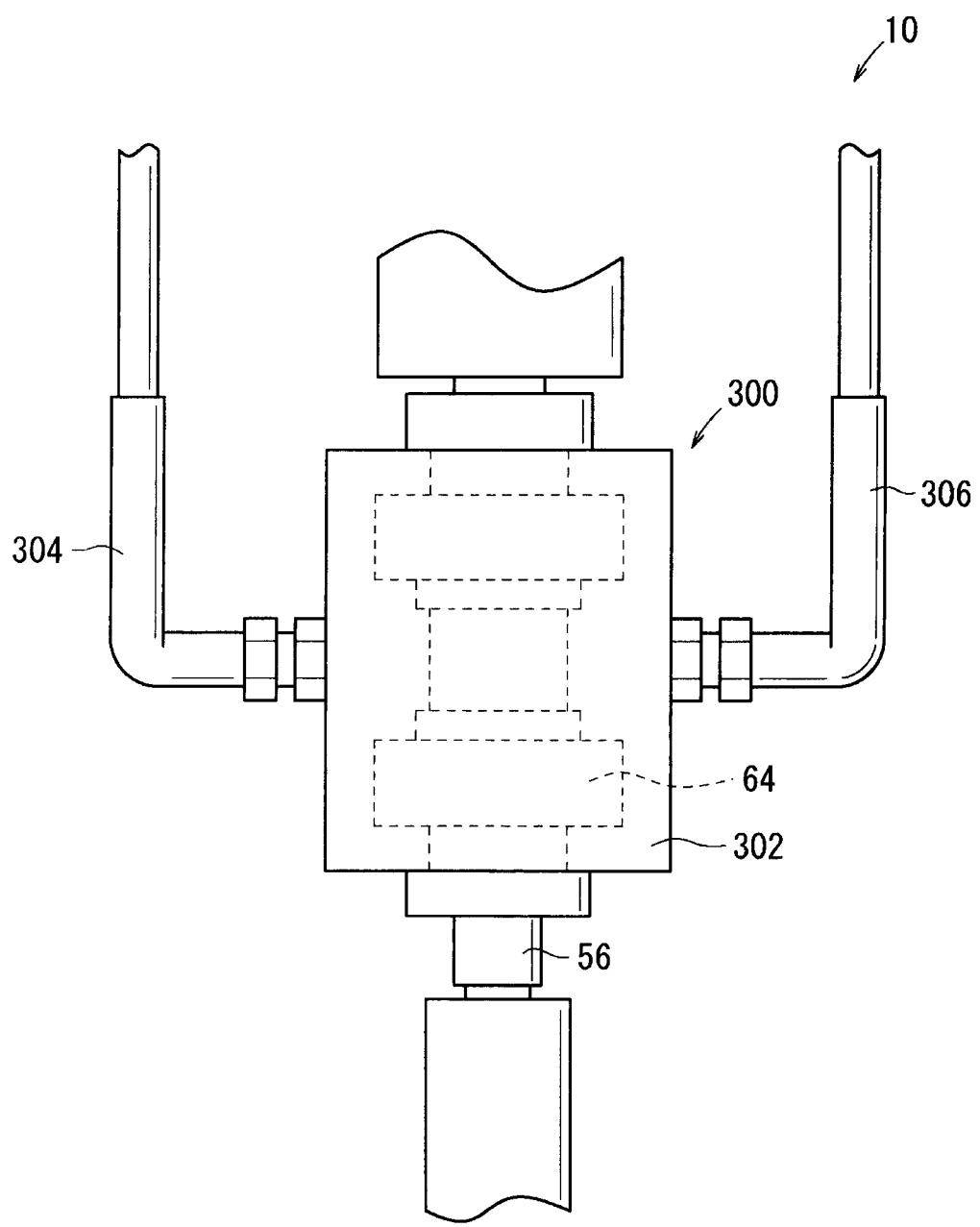
FIG. 16 is a side view of a modification of the cooling unit.

As understood from FIG. 15, in a section between the inside point 154a and the boundary 154c which corresponds to the thread portion 150, the hardness is very high. This is attributed to the fact that the thread portion 150 is mainly composed of bainite. In proximity to the boundary 154c, a steep sloping line 156 is shown so that the hardness abruptly lowers to about 60%.

In a section from the boundary 154c to the boundary 154d corresponding to the thermal-influence section 112, a gentle sloping line 158 is shown so that the hardness further lowers continuously and gently without increasing on the way to about 60% with reference to the boundary 154c from the thread portion 150 toward the base segment 114.

In the remaining section after the boundary 154d corresponding to the base segment 114, the hardness has a slightly lowering tendency, but is nearly constant.

As described above, although the hardness of the thread portion 150 is high and that of the base segment 114 is low, the hardness of the thermal-influence section 112 therebetween shows a gentle change corresponding to the distance from the thread portion 150. This is considered to be attributed to the fact that in the thermal-influence section 112, the metallographic structure of the ferrite is more microscopic towards inner side thereof.

In accordance with such a composition, the thread portion 150 has a sufficient strength so that thread-engagement of the bolt can be surely done; in addition, even if vibration is applied to the base segment 114 or the thread portion 150, the thermal-influence section 112 can absorb vibration by its elasticity. This gives an effect of locking between the bolt and female thread 15. Particularly, the thermal-influence section 112 is lower in hardness than the thread portion and the hardness lowers from the thread portion 150 to the base segment 114 so that a characteristic of the springs with plural elastic coefficients complexed is given thereby absorbing the vibration with various frequencies. Further, since the thermal-influence section 112 connects the thread portion 150 with the base segment 114 in such a manner that their hardness gently change, local stress does not concentrate thereon.

As described above, in accordance with the bushing 14 serving as a nut according to this embodiment, the provision of the thermal-influence section 112 as a hardness gradient portion gives the following advantages. Namely, the thread portion 150 has a sufficient strength so that thread-engagement of the bolt 168 can be surely done; in addition, even if vibration is applied to the base segment 114 or the thread portion 150, the thermal-influence section 112 can absorb vibration by its elasticity, thereby preventing loosening of the bolt 168.

In place of the cooling unit 62 described above, a cooling unit 300 as shown in FIG. 16 may be employed.

In the cooling unit 300, the periphery of a bearing block 64 is covered with a box 302 to which a cooled compressed air is supplied from an inlet pipe 304. Thus, the bearing block 64 and rotating rod 56 are cooled so that the machining tool 60 can be indirectly cooled.

By covering the bearing block 64 with the box 302, the cooled compressed air is touched with the object to be cooled without diffusing wastefully and keeping a high density, thereby executing efficient cooling. The air having cooled the bearing block 64 and others within the box 302 is discharged from an outlet pipe 306 provided on the side opposite to the inlet pipe 304. Thus, the compressed air is not discharged into the atmosphere so that the sound is calm.

Figure 17:
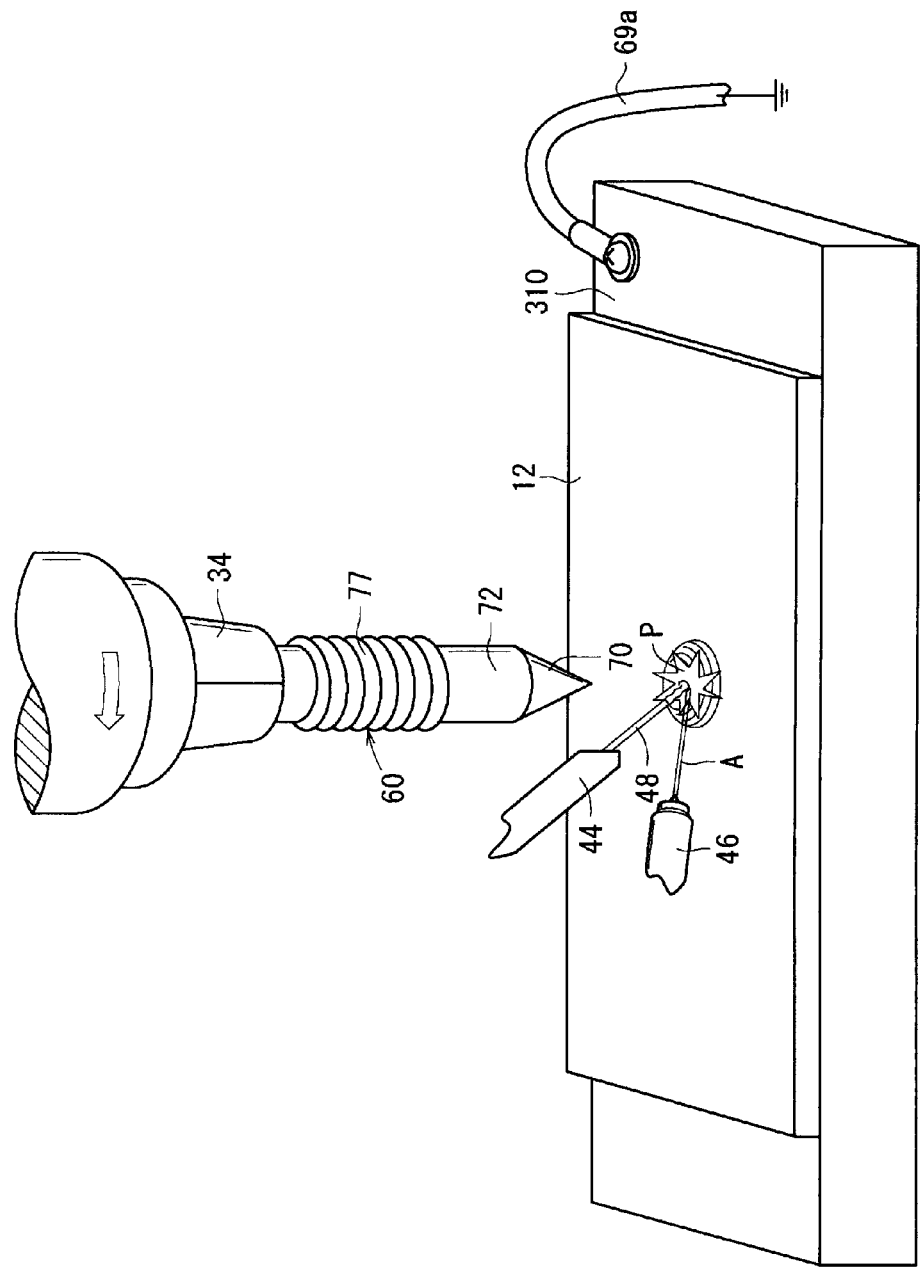
FIG. 17 is a schematic view of a machining stand having a grounding line.

Within the box 302, for efficiently cooling, a guide wall for suitably setting a path through which the compressed air passes may be provided. Further, as shown in FIG. 17, in place of the negative electrode plates 69, a grounding line 69a may be provided on a machining stand 310 for securing the frame 12 or its part containing the bushing machining position P, a jig, a truck, etc. Thus, the frame 12 is electrically connected to the negative electrode so that no electrode plate 69 is needed on the side of the machining device, thereby simplifying the installation and working.

Next, an explanation will be given on modifications of a bushing 1014 according to an aspect of the embodiment.

The bushing 1014 is provided with a concave segment 1200 formed on a seat surface on a base side. The thread segment 1150 has a diameter reducing side portion 1202 of which wall thickness becomes thin toward the tip end side to form a convex curved shape in a side sectional view.

The concave segment 1200 is concentric with the thread segment 1150 and is set within a range of 1.3 to 1.6 times as large as the nominal diameter d of the female thread 1015. The concave segment 1200 may include the center of the seat on the base side and at least the range of 1.2 time as large as the nominal diameter d of the female thread 1015. Thus, as described later, when a bolt 1203 is fastened, an axial force is generated and the diameter of the diameter reducing side portion 1202 is reduced. For actual use of the bushing 1014, the maximum value of the concave segment 1200 may be about 2.0 times as large as the nominal diameter d. The maximum depth Xd of the concave segment 1200 may be e.g. about 0.5 pitch of the female thread 1015.

Figure 18:
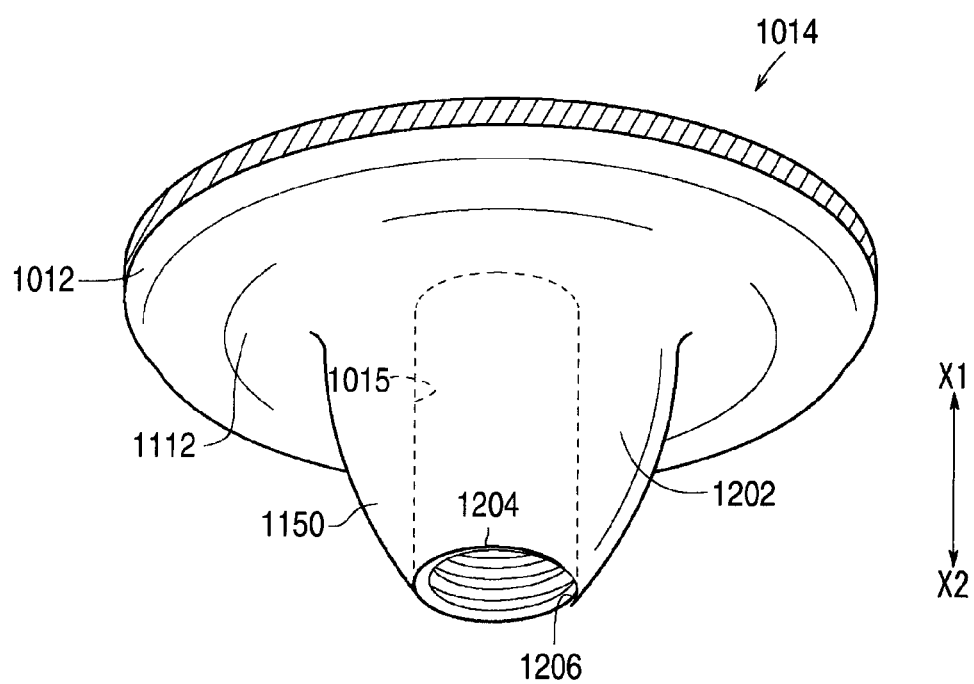
FIG. 18 is a perspective view of a bushing viewed from obliquely downward direction.

The wall thickness in radial direction of the diameter reducing side portion 1202 is relatively thick on the base side and becomes thin first gently and gradually abruptly toward the tip end side. At the tip end, the radial thickness is substantially zero except the thread crest. Thus, as shown in FIG. 18, the tip end 1204 is formed in ring-shape except for a thread root 1206 at a point and has small width substantially zero. The wall radial thickness of the tip end 1204 may not necessarily zero; if it is 1/10 times or less as large as the wall thickness of the end on the base side, it is sufficiently thin and the diameter reducing side portion 1202 can be easily elastically deformed, thereby improving the biting effect with the bolt. Further, the wall-thin structure leads to an effect of cost reduction and light-weighting.

It is difficult to form the tip end 1204 in a ring shape having small width over the entire periphery because of the presence of the thread root 1206 and according to a machining condition. However, if at least a part of the tip end 1204 is formed in a ring shape having small width, the above effect can be obtained.

Further, if the tip end 1204 is formed in the ring shape having the small width with no flat area, this portion is particularly likely to bite the bolt 1203, thereby giving a greater effect of stopping falling-off.

Figure 19:
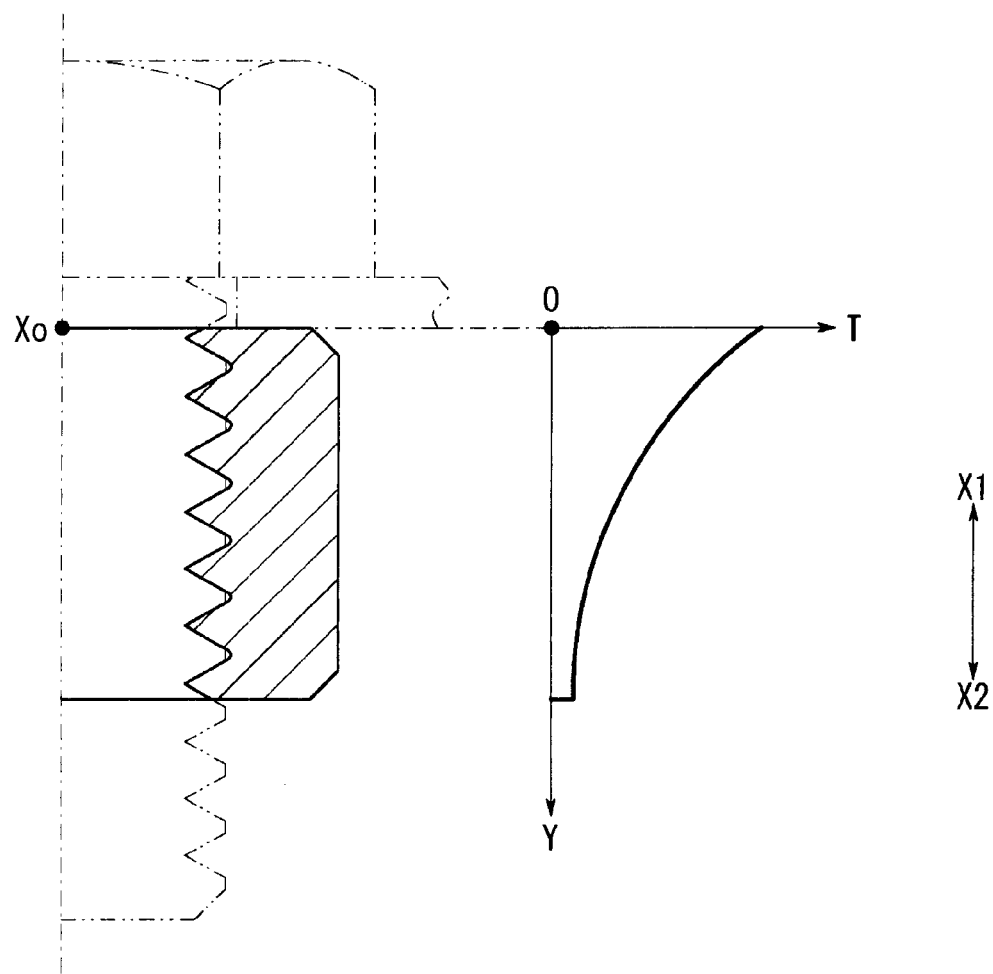
FIG. 19 is a graph showing the stress distribution of fastening a general nut and bolt.

The convex curved shape on the diameter reducing side portion 1202 is formed in accordance with the distribution of fastening torque so that the diameter of the bolt can be reduced in accordance with the axial force of the bolt. Specifically, according to the description of the Non-Patent Reference, as shown in FIG. 19, generally, the stress distribution T according to the fastening torque of the nut and bolt makes a curve which takes maximum at a base point $X_0$ and gently lowers toward the tip side. Since the side shape of the thread segment 1150 corresponds to this stress distribution T, the stress can be shared reasonably. In addition, since the diameter of the diameter-reduced segment 202 becomes thinner toward the tip end side, the diameter reducing side portion 1202 can be elastically deformed in accordance with the fastening force between the bolt and nut.

Further, the diameter reducing side portion 1202 is convexly curved so that the tip end 1204 is further likely to bite the bolt 1203.

Meanwhile, the wall thickness of the tip end 1204 is very thin and it is difficult to form the tip end 1204 in an ideal arc shape in section. On the other hand, since the base end is connected to the thermal-influence section 1112, the base end is also difficult to be formed in the arc shape in section. Thus, according to a designing condition and machining condition, there is a case where the entire length of the side of the thread segment 1150 cannot be formed in a convex curved shape. However, if the axial length of the diameter reducing side portion 1202 is at least half of the entire axial length of the nut, convexly curved in the diameter reducing side portion 1202, the above effect can be obtained.

The entire periphery on the base side of the bushing 1014 is connected to the frame 1012 via the thermal-influence section 1112. A central part of a surface of the thermal-influence section 1112 is recessed relative to a peripheral part of the surface of the thermal-influence section 1112 to form a concave segment 1200. Here, the central part of the surface is smoothly connected to the peripheral part of the surface in a tapered manner. In other words, the thermal-influence section 1112 is formed in a shape inclining slightly downward toward the inside thread segment 1150 and is connected smoothly and nearly horizontally to the host segment 1114.

Namely, at least the inner side portion of the thermal-influence section 1112 is convex in the direction of projecting the thread segment 1150 (toward the tip side, i.e. downward in FIG. 12) and the base side constitutes a part of the concave segment 1200. Thus, the thermal-influence section 1112 functions as a spring efficiently. This can be easily understood, for example, from the fact that a accordion-like member is more likely to flex than a liner member.

In this way, by forming the concave segment 1200 of a metallic plate having a tapered shape, this segment serves as a spring and the diameter of the diameter reducing side portion 1202 can be further reduced.

Next, an explanation will be given on the operation when the bolt 1203 is fastened to the bushing 1014 structured as described above.

Figure 20:
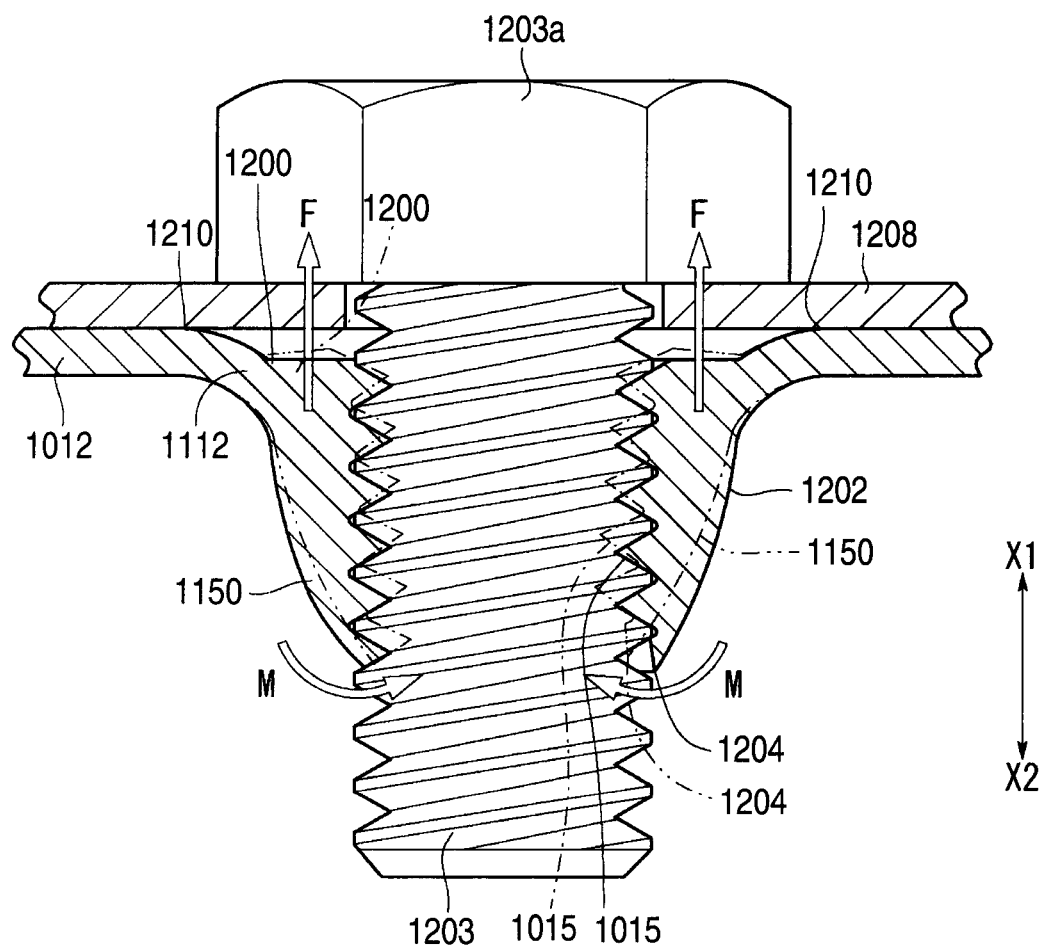
FIG. 20 is a sectional view showing a bushing thread-engaged with the bolt.

As shown in FIG. 20, in order to connect a workpiece plate 1208 to the frame 1012, the bolt 1203 is thread-engaged and fastened from the base side of the bushing 1014. After the head 1203a of the bolt 1203 is brought into contact with the workpiece plate 1208, when torque is appropriately applied, axial force F is generated between the thread segment of the bolt 1203 and the thread segment 1150 of the bushing 1014.

At this time, since the concave segment 1200 having an appropriate size is provided on the seat, the bushing 1014 receives the axial force F and urged towards the base side. However, since the peripheral segment 1210 near the seat surface on the base side contacts with the workpiece plate 1208, the thread segment 1150 cannot be moved. Then, in the thread segment 1150, moment M around the peripheral segment 1210 which rotates the thread portion 1150 is generated, and the thread portion 1150 deforms inwardly. In FIG. 20, the displacement of the thread segment 1150 is schematically exaggeratingly shown using a conceptual line.

Further, the thread segment 1150 serves as the diameter reducing side portion 1202 in its nearly entire length so that it is likely to be elastically displaced at the position nearer to the tip. In addition, the tip end 1204 at the tip side is ring shape with small width (see FIG. 18) and likely to bite the bolt 1203. Further, since the thermal-influence section 1112 functions as the spring, the thread segment 1150 is likely to be deformed.

That is, in a conventional bolt and female thread of the nut, the fastening torque is mainly shared by the first crest and first root on the base side and only a small part of the fastening force is shared by the second crest and second root and later.

On the other hand, in the bushing 1014 according to this embodiment, since the concave segment 1200 is provided on the base side seat, when fastening the bolt 1203 to the female thread, the concave segment 1200 is deformed owing to the axial force F. This deformation influences the nearly entire of the bushing 1014, and since the wall diameter of the diameter reducing side portion 120 is thinner toward the tip end side, a tip-end-side part of the diameter reducing side portion 120 is likely to be deformed rather than the based-end-part thereof and the second crest and second root and later are displaced to radially inwardly, thereby biting the bolt 1203. Thus, the bushing 1014 can effectively prevent loosening of the bolt 1203 by this simple structure.

According to this bushing 1014, even if using this bushing 1014 at a workpiece on which vibration is applied such as a vehicle, the loosening of the fastening state is hardly occurred. Further, the diameter of the bushing 1014 can be made small and it is not necessary to impart excessive large torque onto the bushing 1014 to surely fasten the bushing 1014.

The bushing 1014 may be formed by the means other than the female thread machining device 10 such as cutting or forging. The material of the bushing 1014 should not be limited to bainite, ferrite, spherical cementite and etc.

The inventors of this invention have carried out a comparison experiment regarding the gap generated between the thread crest and thread root for the cases where the bolt 1203 is fastened to the bushing 1014 according to this embodiment and where a conventional nut 1212 is welded to the frame 1012 as in the prior art.

Figure 21:
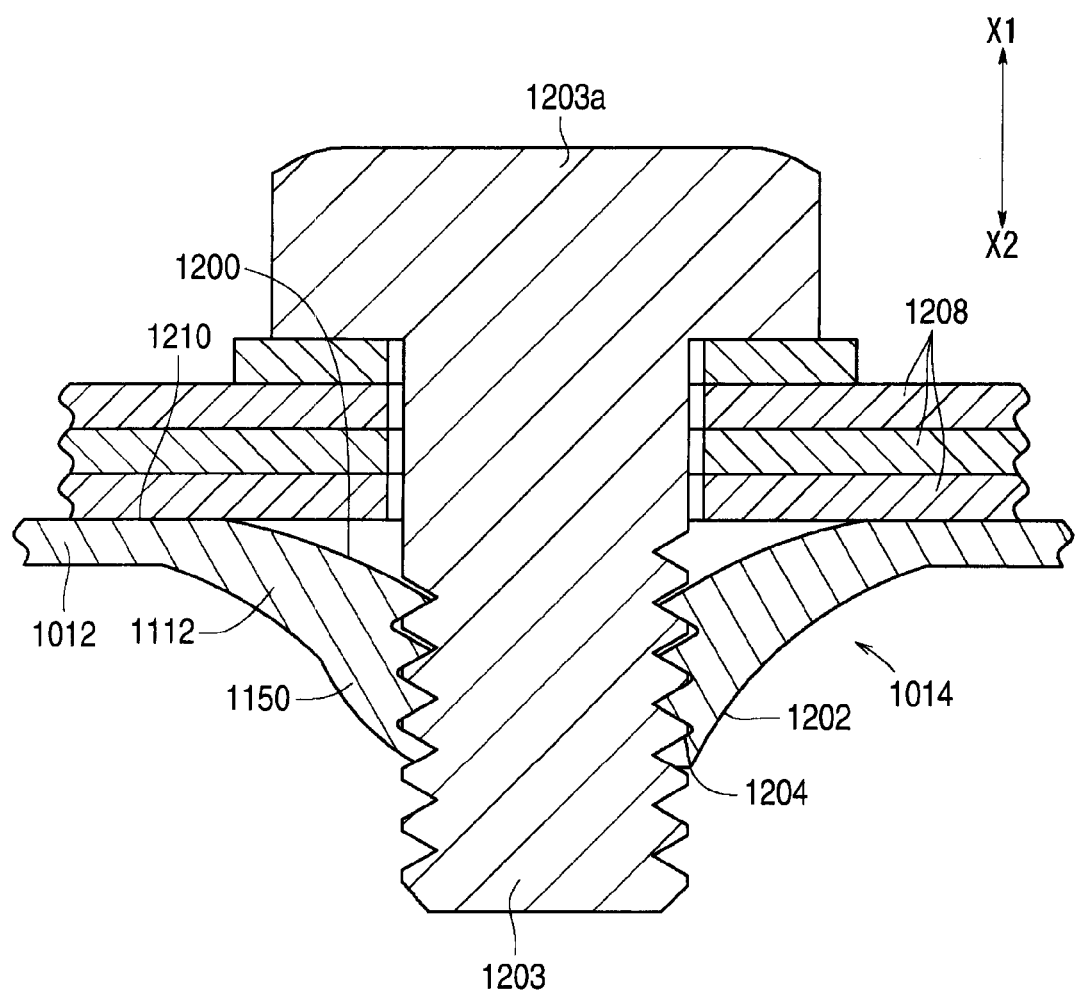
FIG. 21 is a view showing experimental results which show gaps generated between thread crests and thread roots in when the bolt is fastened to the bushing according to this embodiment.

As a result of the experiment, where the bolt 1203 is fastened to the busing 1014, it has been confirmed that as shown in FIG. 21, a slight gap exists between the thread crests and the thread roots over the entire length and particularly, at the tip end side, there is hardly any gap.

Figure 22:
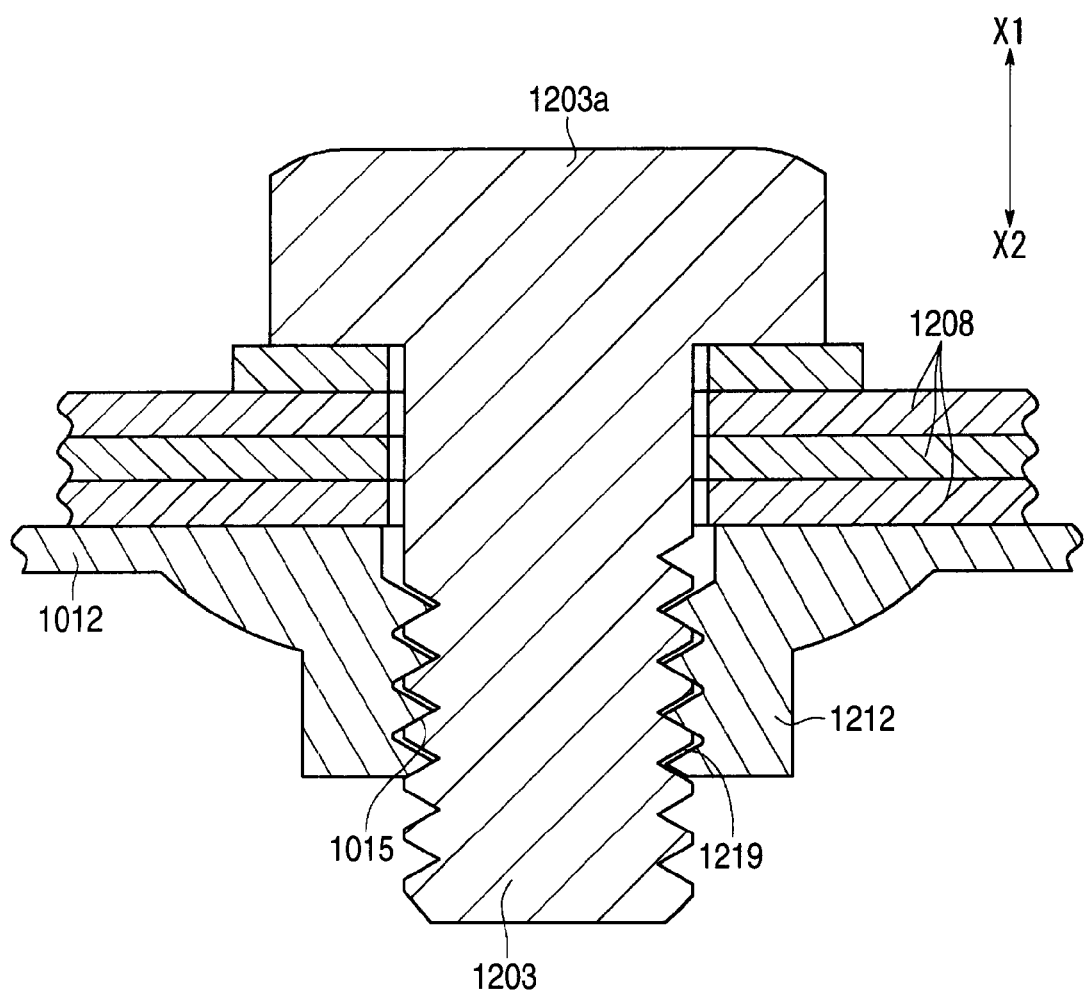
FIG. 22 is a view showing the experiment results which show the gap generated between the thread crests and the thread roots when an ordinary nut is welded to a frame.

On the other hand, where the conventional nut 1212 is welded to the frame 1012, it has been confirmed that as shown in FIG. 22, the gap exists between the thread crests and the thread roots over the entire length and particularly, at the tip end side, a large gap 1219 exists. Also from the experimental result, the locking effect by the busing 1014 according to this embodiment can be understood.

Next, nuts 1220 and 1222 according to modifications will be explained. In these nuts 1220 and 1222, like reference numerals referring to like parts of the bushing 1014 will not be explained in detail.

Figure 23:
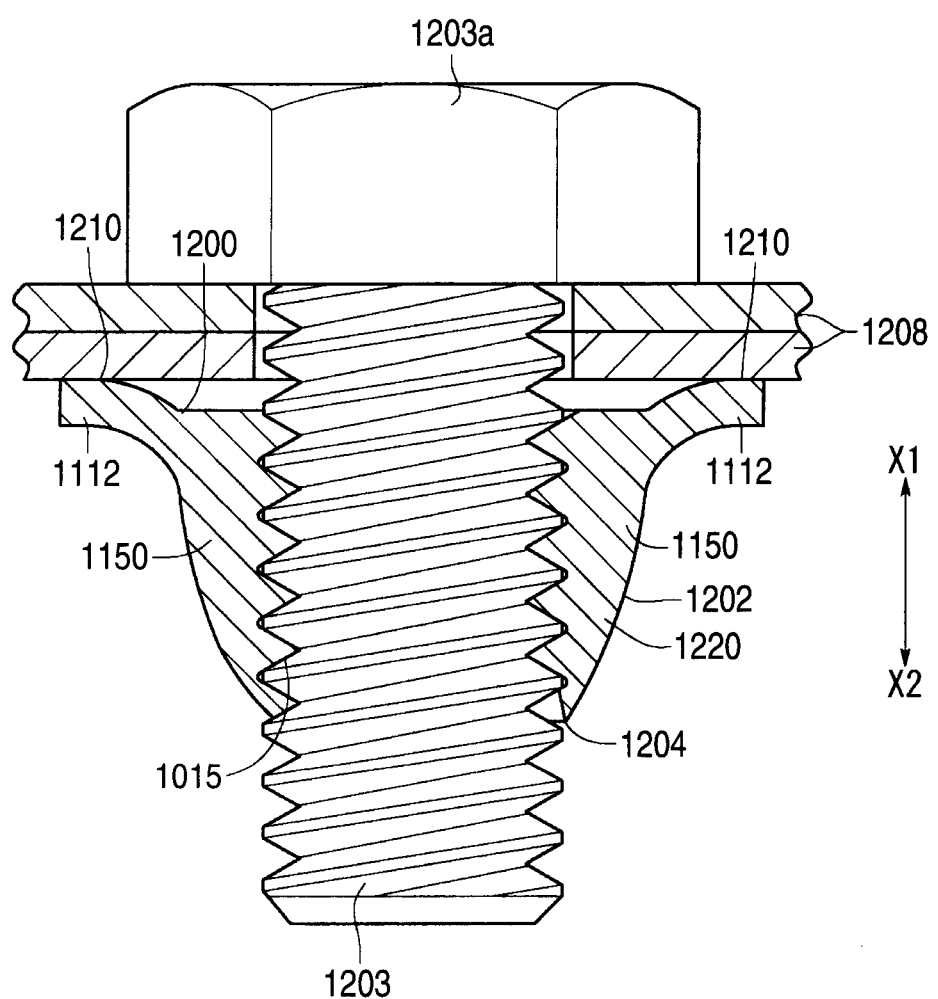
FIG. 23 is a sectional view of a nut, workpiece and a bolt according to the first modification.

As shown in FIG. 23, the nut 1220 according to the second modification is a single unit in which the bushing 1014 is cut from the frame 1012. The nut 1220, which includes a part of the flat frame 1012 and the thermal-influence section 1112, is kept in stable contact with the workpiece plate 1208.

Figure 24:
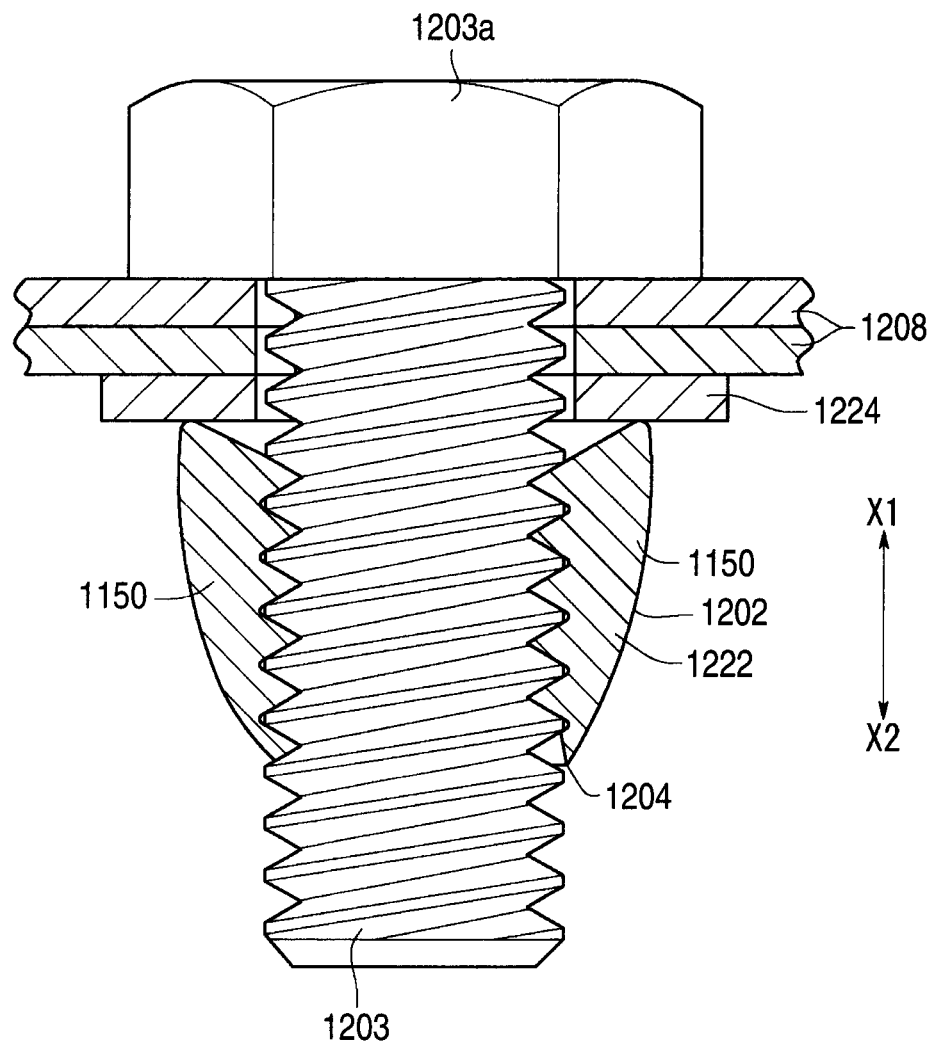
FIG. 24 is a sectional view of a nut, workpiece and a bolt according to the second modification.

As shown in FIG. 24, the nut 1222 according to the third modification is a single unit in which the frame 1012 and the thermal-influence section 1112 are removed from the bushing 1014. The base side seat of the nut 1222, whose nearly entire surface except for the peripheral end constitutes the concave segment 1200, and the radial dimension of the diameter reducing side portion 1202 is greatly small. This nut 1222 may be provided with a washer 1224.

Figure 25:
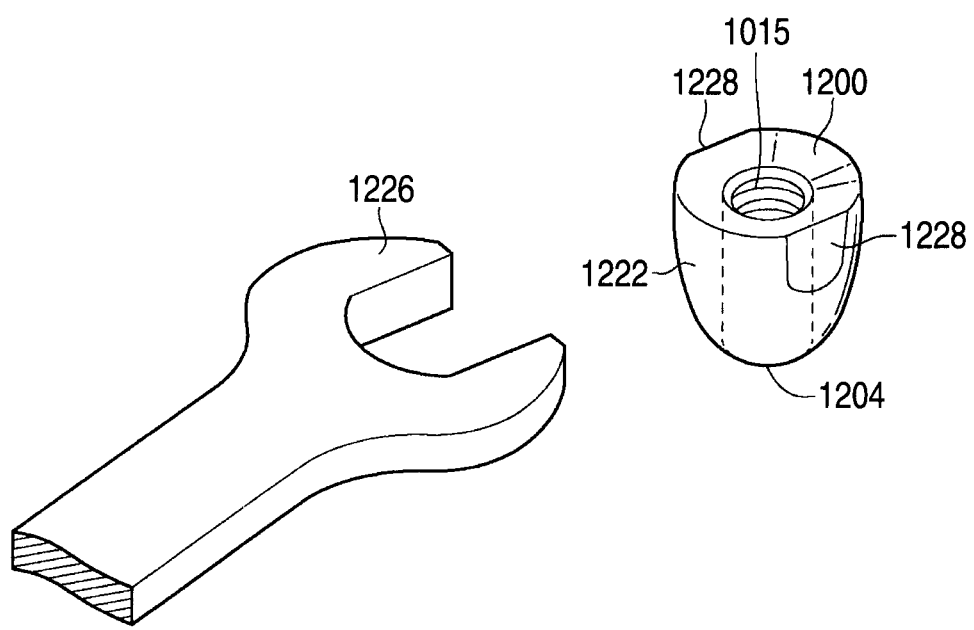
FIG. 25 is a perspective view of the nut according to the second modification having an engaging area.

As shown in FIG. 25, on the side of the single unit of nut 1222 (or 1220), an engaging area 228 with which a tool 1226 such as a spanner is engaged may be formed.

It is needless to say that the nut according to this invention can be realized in various constructions without departing from the spirit of this invention.

While the invention has been described in connection with the exemplary embodiments, it will be obvious to those skilled in the art that various changes and modifications may be made therein without departing from the present invention, and it is aimed, therefore, to cover in the appended claim all such changes and modifications as fall within the true spirit and scope of the present invention.

What is claimed is:

1. A female thread machining device comprising:
   a heating unit which heats a region where a female thread is to be formed in a metallic workpiece including a metallic plate;
   a machining tool which forms the female thread in the metallic workpiece;
   a chuck that detachably holds the machining tool;
   a rotation-driving unit which rotates the machining tool;
   an advance/retract driving unit which advances or retracts the machining tool;
   a rotating rod that extends between the rotation-driving unit and the chuck; and
   a cooling unit adapted to discharge fluid onto the rotating rod at a position between the chuck and the rotation-driving unit so as to cool the machining tool.

2. The female thread machining device according to claim 1,
   wherein the cooling unit indirectly cools the machining tool through the chuck.

3. The female thread machining device according to claim 2, wherein the cooling unit jets air onto the chuck or surrounding of the chuck to cool the machining tool.

4. The female thread machining device according to claim 2,
   wherein the cooling unit passes liquid through a flow path to cool the machining tool.

5. The female thread machining device according to claim 1, wherein the machining tool comprises:
   a small diameter section provided at a tip end of the machining tool and adapted to form a hole in the metallic workpiece; and
   a tapping section provided continuously from the small diameter section and adapted to form the female thread in the hole.

6. The female thread machining device according to claim 1, further comprising a bearing block that rotatably supports the rotating rod at a position that is spaced from the chuck and the rotation-driving unit, wherein the cooling unit includes an air supply port that externally discharges the fluid onto the bearing block.

7. The female thread machining device according to claim 1, further comprising a filler feeding machine that feeds a filler on the metallic plate to thicken the metallic workpiece.

8. A female thread machining method comprising:
   a heating step of, by a heating unit, heating a region of a metallic workpiece including a metallic plate where a female thread is formed to an austenitizing temperature or higher;
   a cooling step of cooling a machining tool, which is adapted to form the female thread in the metallic workpiece, by a cooling unit;
   a machining step comprising:
      stopping heating the metallic workpiece by the heating unit and continuing cooling the machining tool by the cooling unit;
      inserting the machining tool into the metallic workpiece while rotating the machining tool; and
      forming the female thread by the machining tool while cooling the metallic workpiece by the machining tool; and
   a heat-radiating step of cooling the metallic workpiece after the machining step so that a metallographic structure of a portion of the metallic workpiece is changed to a bainite structure.

9. The female thread machining method according to claim 8, wherein in the machining step, the metallic workpiece is cooled so that a metallographic structure of another portion of the metallic workpiece is changed to a bainite structure.

10. The female thread machining method according to claim 8, wherein the metallic workpiece is air-cooled in the heat-radiating step.

11. The female thread machining method according to claim 8, wherein the cooling step comprises sending fluid to a portion of a connecting structure that connects a rotation-driving unit to the machining tool, the connecting structure comprising a chuck that detachably holds the machining tool, wherein said portion of the connecting structure is located between the rotation-driving unit and the chuck.

12. The female thread machining method according to claim 8, further comprising feeding a filler on the metallic plate to thicken the metallic workpiece.

* * * * *